US011308251B2

(12) United States Patent
Koch et al.

(10) Patent No.: US 11,308,251 B2
(45) Date of Patent: Apr. 19, 2022

(54) METHOD AND SYSTEM FOR MINIMIZING EARTHWORK VOLUMES

(71) Applicant: Autodesk, Inc., San Rafael, CA (US)

(72) Inventors: Valentin R. Koch, Kelowna (CA); Hung M. Phan, Dracut, MA (US)

(73) Assignee: AUTODESK, INC., San Rafael, CA (US)

(*) Notice: Subject to any disclaimer, the term of this patent is extended or adjusted under 35 U.S.C. 154(b) by 103 days.

(21) Appl. No.: 16/906,856

(22) Filed: Jun. 19, 2020

(65) Prior Publication Data

US 2020/0401741 A1    Dec. 24, 2020

Related U.S. Application Data

(60) Provisional application No. 62/864,830, filed on Jun. 21, 2019.

(51) Int. Cl.
*G06F 30/20*    (2020.01)
*G06F 111/10*    (2020.01)
*G06F 111/04*    (2020.01)

(52) U.S. Cl.
CPC .......... *G06F 30/20* (2020.01); *G06F 2111/04* (2020.01); *G06F 2111/10* (2020.01)

(58) Field of Classification Search
CPC ... G06F 30/20; G06F 2111/04; G06F 2111/10
See application file for complete search history.

(56) References Cited

U.S. PATENT DOCUMENTS

| 7,129,947 | B1 * | 10/2006 | Schroeder | G06T 17/20 345/428 |
| 7,133,044 | B2 * | 11/2006 | Maillot | G06T 17/20 345/423 |
| 7,196,702 | B1 * | 3/2007 | Lee | G06T 17/30 345/419 |
| 8,836,701 | B1 * | 9/2014 | Rockwood | G06F 30/00 345/423 |

(Continued)

OTHER PUBLICATIONS

Bauschke, H.H., et al., "Convex Analysis and Monotone Operator Theory in Hilbert Spaces", Canadian Mathematical Society, Springer 2011, pp. 1-469.

(Continued)

*Primary Examiner* — Justin C Mikowski
(74) *Attorney, Agent, or Firm* — Gates & Cooper LLP

(57) ABSTRACT

A method and system provide the ability to design a surface. An existing triangular surface mesh representative of an existing surface is obtained. A modification to the mesh in compliance with design constraints is received. A volume level set or a volume minimization set, for the modified mesh, is obtained in Euclidean space. A volume subgradient set based on the volume level set, is obtained. A scalar is determined and used to scale heights between vertices of a triangle. A projection is computed and may be scaled. The projection may then be removed from the triangle's vertices. The removing changes the triangular surface mesh into a converged triangular surface mesh that minimizes an objective function. The objective function computes an absolute earthwork volume and/or an absolute value of a net volume representing the difference between a fill and cut of earthwork material.

18 Claims, 13 Drawing Sheets

(56) References Cited

U.S. PATENT DOCUMENTS

| | | | |
|---|---|---|---|
| 2008/0065359 A1* | 3/2008 | Rudolph | G06F 30/20 703/2 |
| 2008/0259077 A1* | 10/2008 | Liepa | G06T 19/20 345/423 |
| 2016/0232262 A1* | 8/2016 | Shayani | G06F 30/20 |

OTHER PUBLICATIONS

Bauschke, H.H., et al., Projection Methods: Swiss Army Knives for Solving Feasibility and Best Approximation Problems with Halfspaces, American Mathematical Society, Providence, RI, 2015, pp. 1-39.

Bauschke, H.H., et al., "Stadium Norm and Douglas-Rachford Splitting: A New Approach to Road Design Optimization", Operations Research, Sep. 2014, pp. 1-35, vol. 64, No. 1.

Bauschke, H.H., et al., "On the Convexity of Piecewise-Defined Functions", ESAIM: Control, Optimisation and Calculus of Variations, Aug. 2014, pp. 1-18.

Combettes, P.I., et al., "Proximal Splitting Methods in Signal Processing", Optimization and Control (math.OC) Numerical Analysis, 2009, pp. 1-25.

Douglas, J., et al., "On the Numerical Solution of Heat Conduction Problems in Two and Three Space Variables", Transactions of the AMS, 1955, pp. 421-439.

Lions, P.L., et al., "Splitting Algorithms for the Sum of Two Nonlinear Operators", Siam J. Numer. Anal, Dec. 1979, pp. 964-979, vol. 16, No. 6.

Meyer, C.D., "Matrix Analysis and Applied Linear Algebra", SIAM, 2000, pp. 1-890.

Moreau, J.J., "Proximité et dualité dans un espace hilbertien". Bulletin de la Société Mathématique de France 93 1965, pp. 273-299.

Rockafellar, R.T., "Convex Analysis", Princeton University Press, 1970, pp. 1-468.

Beck, A., "First-Order Methods in Optimization", SIAM, 2017, pp. 1-10.

\* cited by examiner

METHOD AND SYSTEM FOR MINIMIZING EARTHWORK VOLUMES

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 62/864,830, filed on Jun. 21, 2019, with inventor(s) Valentin R. Koch and Hung M. Phan, entitled "Proximity Operator to Minimize Earthwork Volumes,".

This application is related to the following and commonly-assigned patent application, which application is incorporated by reference herein:

U.S. patent application Ser. No. 15/705,083, filed on Sep. 14, 2017, which issued Feb. 9, 2021 as U.S. Pat. No. 10,915,670 with inventor(s) Valentin R. Koch and Hung M. Phan, entitled "Spatial Constraint Based Triangular Mesh Operations in Three Dimensions,", which application claims the benefit under 35 U.S.C. Section 119(e) of and commonly-assigned Provisional Application Ser. No. 62/394,608, filed on Sep. 14, 2016, with inventor(s) Valentin R. Koch and Hung M. Phan, entitled "Applying Geometric Constraints on Triangles in Three Dimensions,", both of which are incorporated by reference herein.

BACKGROUND OF THE INVENTION

1. Field of the Invention

The present invention relates generally to civil engineering road design, and in particular, to a method, apparatus, and article of manufacture for minimizing earthwork volume movement in a triangular surface mesh.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

A common representation of three dimensional objects in computer applications such as graphics and design, are triangular meshes. In many instances, individual or groups of triangles need to satisfy spatial constraints that are imposed either by observation from the real world, or by concrete design specifications for the objects. For example, in road/drainage pool/channel design, grade/slope changes must comply with local minima/maxima (e.g., a road slope must be lower than a slope maximum according to federal highway road standards). Thus, designers must consider as variety of surface maximum and minimum slope constraints, surface alignment constraints, as well as other surface slope requirements that are not only based on the real-world feature being designed (e.g., a difficulty of a golf course) but also essential for drainage and environmental impact.

Patent application Ser. No. 15/705,083 contains a method to find design solutions that satisfy these constraints, and that are optimal with respect to terrain smoothing or terrain smoothness. Further, patent application Ser. No. 15/705,083 provides further background information on the various problems arising in civil engineering design, triangular irregular networks (TIN), etc.

While spatial/other constraints must be satisfied, it is often desirable to simultaneously attempt to achieve one or more objectives. For example, while a slope constraint must be complied with, the designer may also have an objective of minimizing the earthwork volume (e.g., the costs associated with the volume of earthwork used in a project). Another desired objective may consist of attempting to balance the earthwork cut and fill (e.g., reusing the cut earthwork volume in another area where fill is needed). Prior art methods fail to provide the ability to utilize both constraints and objectives, or to simply attempt to comply with objectives when designing a surface consisting of a triangular surface mesh.

SUMMARY OF THE INVENTION

One or more embodiments of the invention provide a method and system for designing a surface such that the earthwork volume is minimized in the triangular mesh representing the surface. The method may be used as a proximity operator on one or many triangles in the triangular surface mesh. Further, embodiments of the invention may utilize a proximity operator to balance the cut and fill of earthwork volume. The result is the ability to minimize and/or balance earthwork volumes in the computer-aided design of surfaces for civil engineering in three dimensions.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1A:
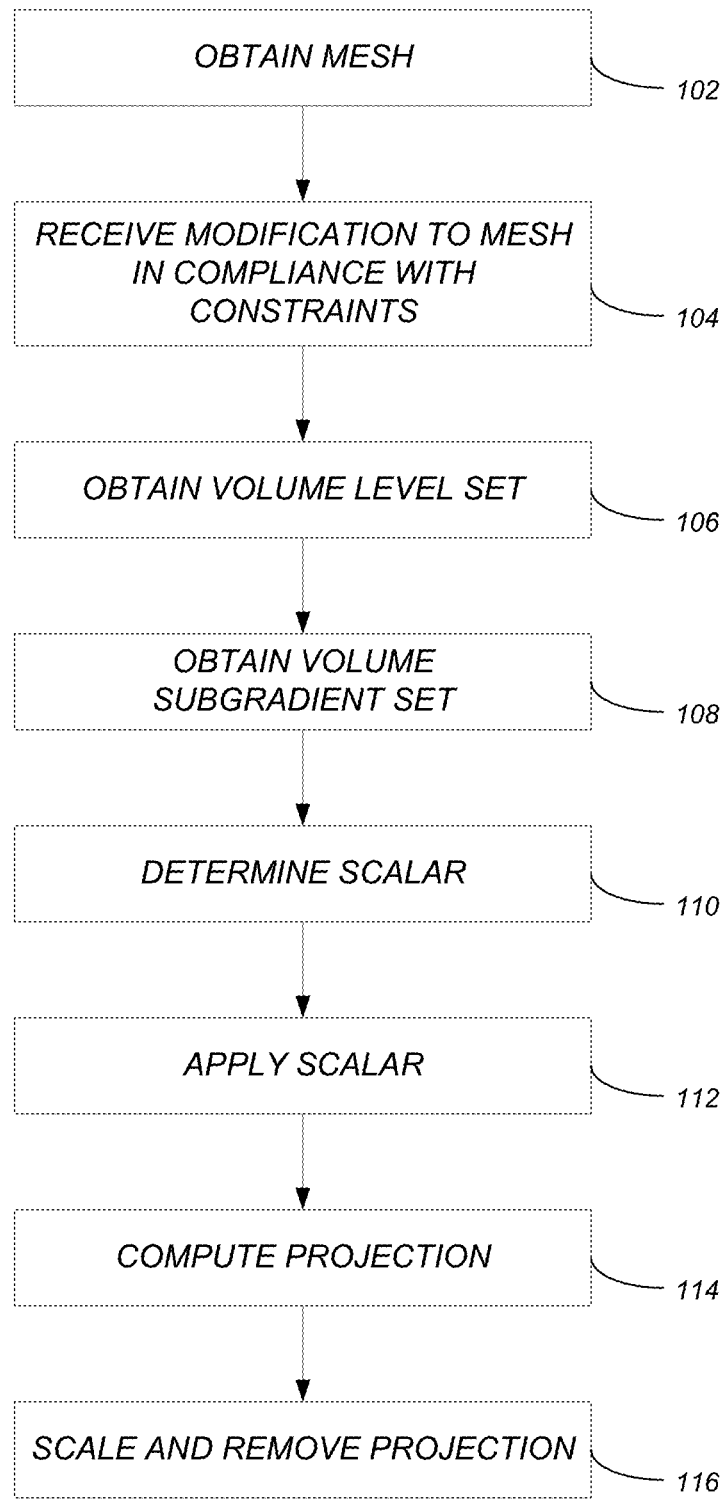
FIG. 1A illustrates the logical flow for designing a surface based on an absolute earthwork volume in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention define a method that can be used as a proximity operator for an objective function that minimizes earthwork volumes, in conjunction with projections (or proximity operators) onto civil engineering constraints on triangular surface meshes, where the method and other proximity operators can be assigned different weights.

Additional embodiments define a method that can be used as a proximity operator for an objective function that minimizes the difference between cut and fill volumes, in conjunction with projections (or proximity operators) onto other civil engineering constraints on triangular surface meshes, where the method and other proximity operators can be assigned different weights.

Method Overview

Embodiments of the invention are based on proximity operators and projections, and the use of proximity operators and projections in iterative ways to find solutions for feasibility or optimization problems.

As used herein, a projection of a point onto a convex set is the shortest distance of that point to the set. For example, if a set is a plane in three dimensions, then the projection of a point onto that set is its shadow on the plane. If the point to be projected is already on the plane, than the projection is the point itself. Given multiple sets (e.g. multiple planes in three dimensions) and a starting point, iterative projection methods can be used to find a point in the intersection of all these sets that is closest from the starting point. These methods project iteratively onto the different sets. If the given sets are convex, then the iterative projections will converge to a solution.

Proximity Operator

In mathematical optimization, the proximity operator or proximal operator is an operator associated with a convex function $f$ from a vector space $X$ to $\mathbb{R}$, and is defined by $$\text{Prox}_f(v) = \text{argmin}_{x \in X}(f(x) + \tfrac{1}{2}\|x-v\|^2). \tag{1}$$

Proximity operators may be used in optimization algorithms associated with non-differentiable optimization problems such as total variation denoising.

The proximity operator reduces to the operator that projects a point onto a convex set if $f(x)$ is the 0-∞ indicator function of that convex set. Hence, a proximity or proximal operator is a generalization of a projection.

In embodiments of the invention, we first show the volume function that we try to minimize in order to reduce earthwork. The volume function provides the volume that is generated, when one or more triangles are modified in a triangular mesh that represents a terrain surface.

In embodiments of the invention, a triangle is modified by changing the elevations of a one or more of its vertices by some heights. The set of heights for which the volume function returns one, is called the volume level set. The volume level set looks like a spheroid (see FIGS. 3A and 3B).

In embodiments of the invention, the set of all subgradients of the volume function is called the volume subgradient set. The volume subgradient set looks like a football (see FIGS. 4A and 4B).

Figure 5A:
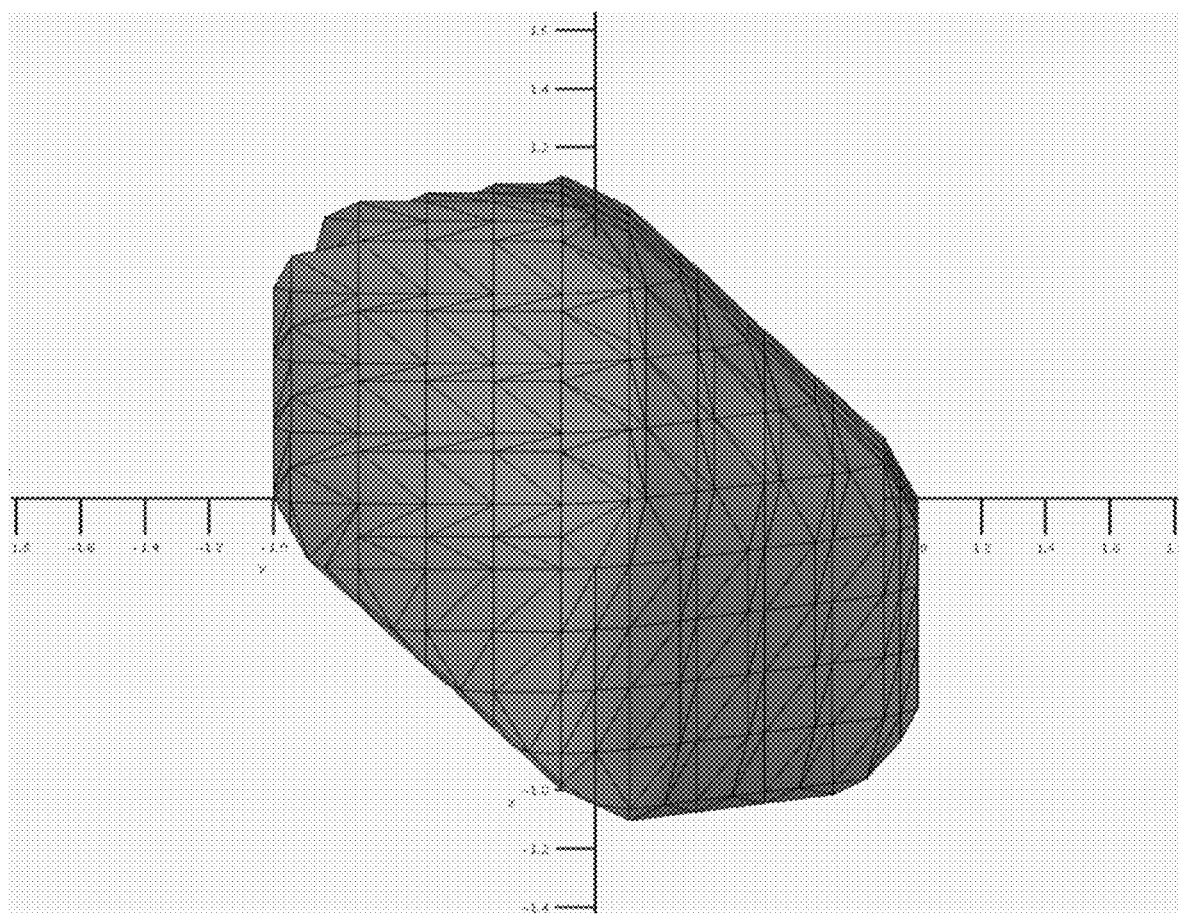
FIGS. 5A and 5B illustrate two orthographic views of polyhedral inner approximations of the volume level set of FIGS. 3A and 3B in accordance with one or more embodiments of the invention.
Figure 5B:
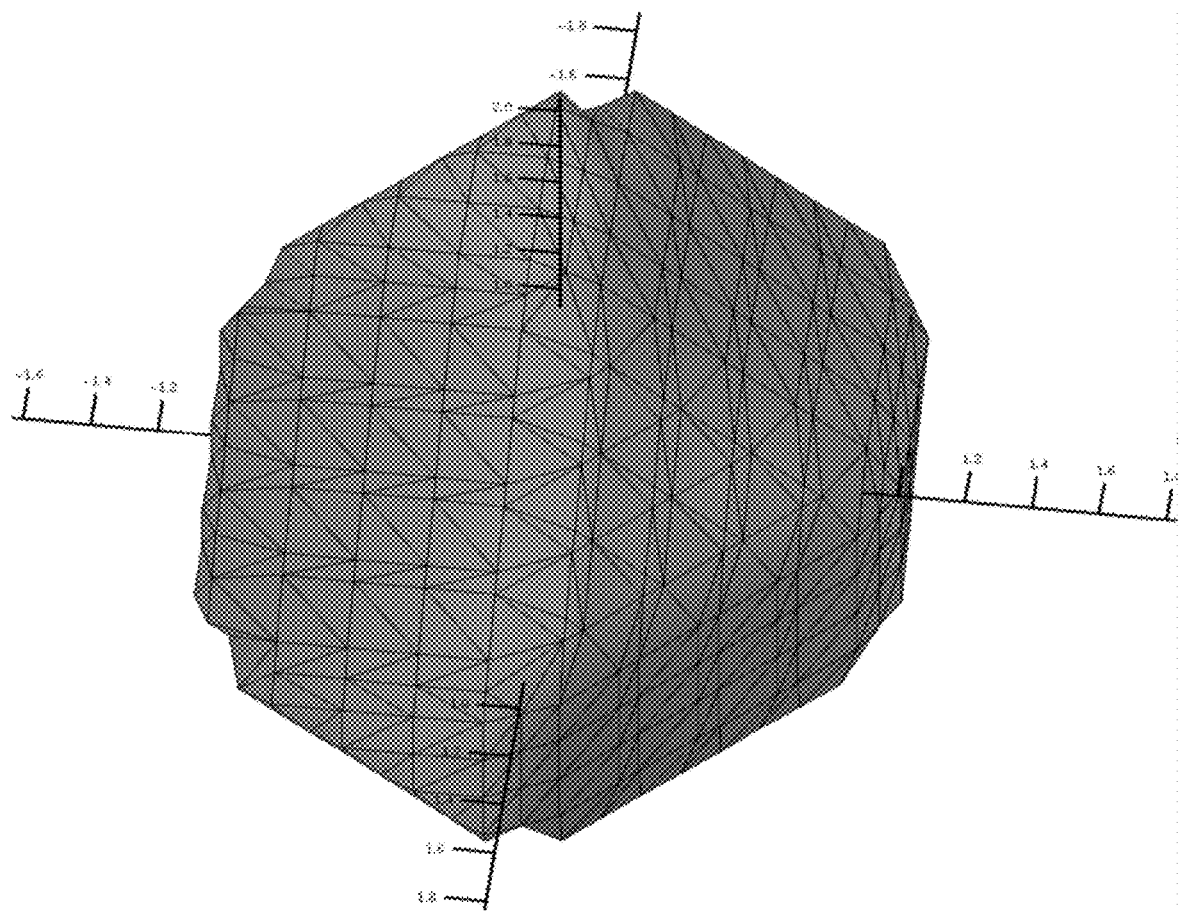

A polyhedral upper approximation of the volume function results in a approximate volume level set that is shown for a triangle in a triangular surface mesh (see FIGS. 5A and 5B).

The polyhedral upper approximation of the volume function can be thought of as a combination of boxes and pyramids inside the spheroid, that make it look like the spheroid. Embodiments of the invention also encompass modifications to the polyhedral upper approximation of the volume function that add finer boxes and pyramids, and/or approximate the spheroid in different ways.

Figure 6A:
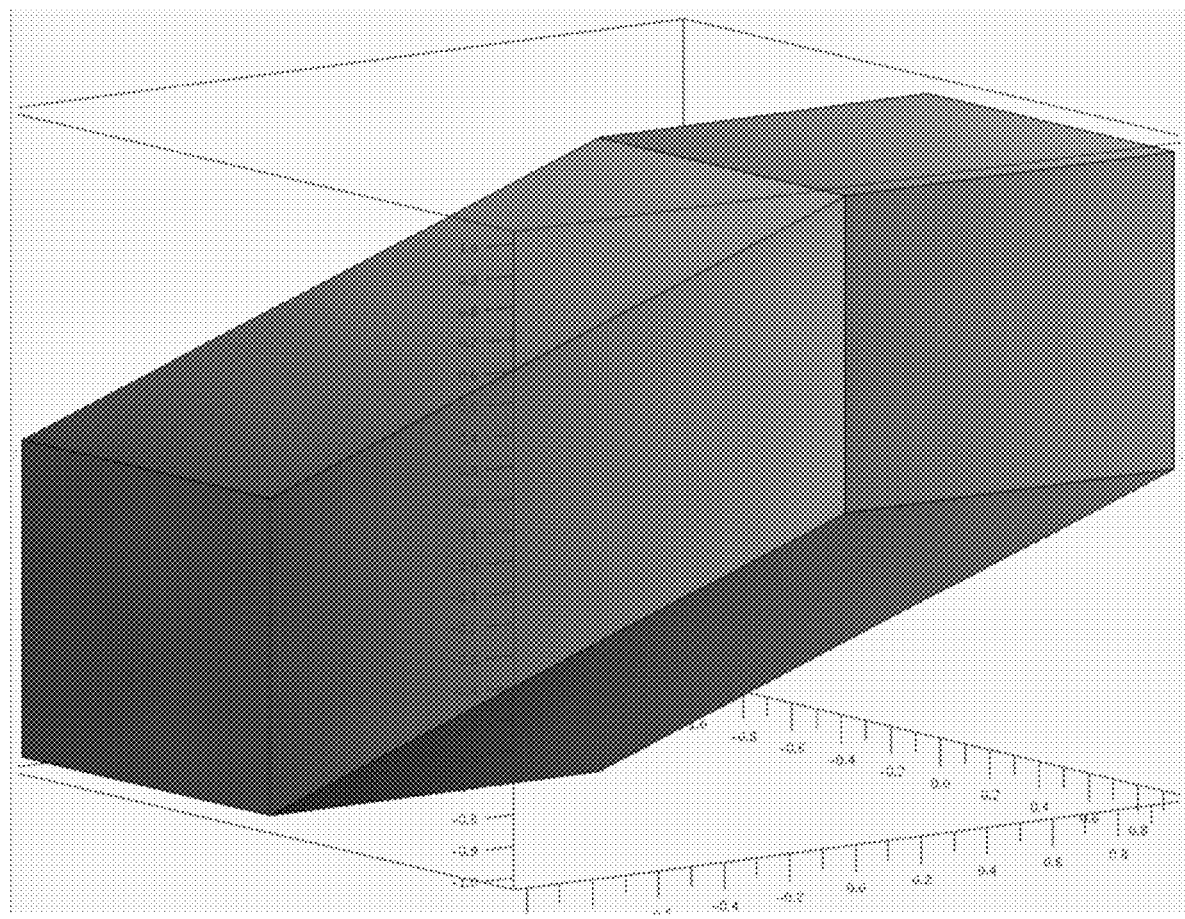
FIGS. 6A and 6B are different orthographic views of a visualization of the outer approximations of the volume subgradient set in accordance with one or more approximate volume subgradient set, in accordance with one or more embodiments of the invention.
Figure 6B:
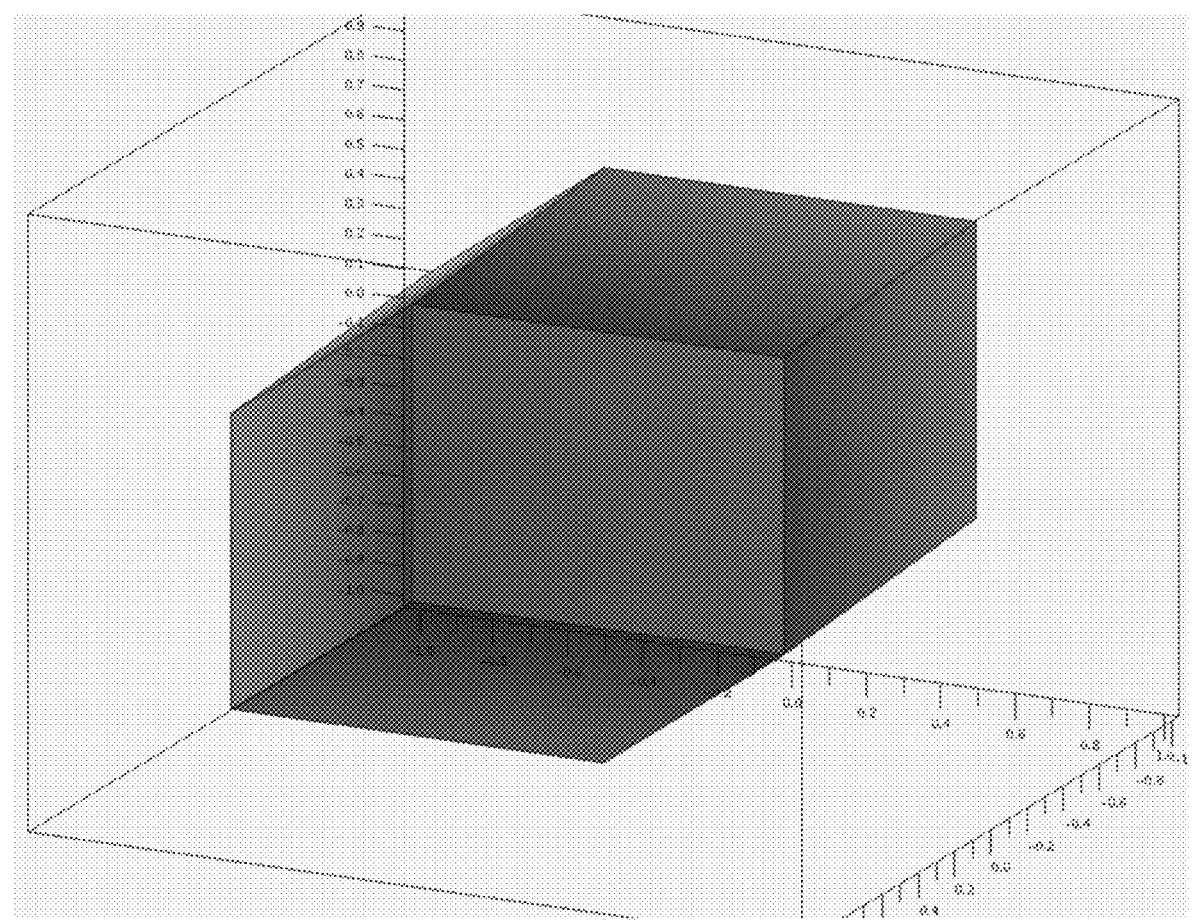

The subgradient set of the polyhedral upper approximation of the volume function is shown for a triangle in a triangular surface mesh (see FIGS. 6A and 6B). This set is also an outer approximation of the volume subgradient set or the football. In embodiments of the invention, it is referred to as the approximate set or set D.

The polyhedral outer approximation of the football can be thought of as a combination of boxes and pyramids around the football, that make it look like the football. Embodiments of the invention also encompass modifications to the polyhedral outer approximation that add finer boxes and pyramids, and/or approximate the football in different ways.

The proximity operator is then derived by finding the projections on the outer approximation of the volume subgradient set or the football.

The pseudo-code below provides for an implementation of the proximity operator in a computer program, which can then be used in combination with other implemented projections and proximity operators in an iterative way, in order to obtain an optimized solution for a civil engineering design for terrain grading.

Logical Flow

FIG. 1A illustrates the logical flow for designing a surface based on an absolute earthwork volume in accordance with one or more embodiments of the invention.

At step 102, an existing triangular surface mesh that is representative of an existing surface is obtained/acquired. The existing triangular surface mesh consists of a first triangle and one or more additional triangles connected by vertices and edges.

At step 104, a modification to the first triangle is received. The modification is in compliance with one or more design constraints, and results in a modified first triangle.

At step 106, a volume level set (in Euclidean space) for the modified first triangle is obtained. Such an obtaining may include obtaining an approximation to the volume level set.

At step 108, a volume subgradient set is obtained (in Euclidean space) based on the volume level set. As part of obtaining the volume subgradient set step, an approximate volume subgradient set (in Euclidean space) may be determined/obtained. Such an approximate volume subgradient set step may outer approximate the volume subgradient set using a polyhedral function. Alternative, or in addition, the approximate volume subgradient set step may contain the volume subgradient set.

At step 110, a scalar to reduce the distance is determined (from the area of the first triangle or the modified first triangle).

At step 112, the scalar is applied by scaling heights between the vertices of the modified first triangle and the first triangle using the scalar.

At step 114, a projection is computed. The projection is from one or more scaled heights of the vertices of the modified first triangle onto the volume subgradient set (in a first of one or more embodiments). Alternatively, the projection may be of one or more heights of the vertices of the modified first triangle onto the net volume minimization set. The projection includes a direction and a distance.

At step 116, the scalar is applied (to the projection) and removed (from the vertices of the modified first triangle) to reduce the distance of the projection. The scalar application provides the following: (1) changes the triangular surface mesh into a converged triangular surface mesh; and (2) the converged triangular surface mesh minimizes one or more objective functions. In addition, in one or more embodiments, (one or more of) the objective functions computes an absolute earthwork volume between the first triangle on the existing surface and the modified first triangle on the converged triangular surface mesh (i.e., the minimization of objective function attempts to minimize earthwork volume).

In one or more embodiments, the scalar is based on user input, and the determination and application of the scalar includes computing a proximity operator based on the scalar.

In one or more embodiments, the objective function may be symmetric positively homogenous, as well as continuous and convex.

In alternative embodiments, (one or more) of the objective functions computes an absolute value of one or more net volumes. In such embodiments, each net volume (of the one or more net volumes) includes a difference between a fill and a cut of earthwork material resulting from modifying the existing triangular surface mesh into the converged triangular surface mesh (i.e., the objective function attempts to balance the cut and fill volumes).

Figure 1B:
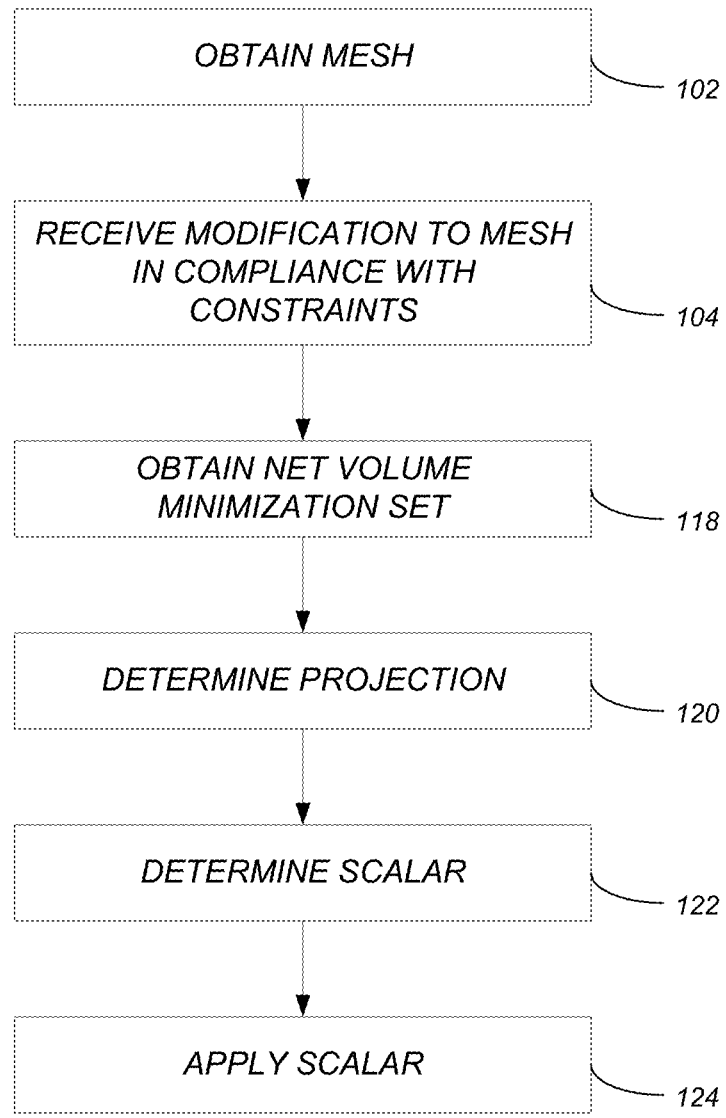
FIG. 1B illustrates the logical flow for designing a surface based on net volume in accordance with one or more embodiments of the invention.

FIG. 1B illustrates the logical flow for designing a surface based on net volume in accordance with one or more embodiments of the invention.

Steps 102 and 104 of FIG. 1A are similar to that of. FIG. 1A. In particular, at step 102, an existing triangular surface mesh that is representative of an existing surface is obtained/acquired. The existing triangular surface mesh consists of a first triangle and one or more additional triangles connected by vertices and edges. At step 104, a modification to the first triangle is received. The modification is in compliance with one or more design constraints, and results in a modified first triangle.

At step 118, a net volume minimization set for the modified first triangle is obtained (in Euclidean space).

At step 120, a projection is determined of the one or more heights of the vertices of the modified first triangle onto the net volume minimization set. The projection consists of a direction and a distance.

At step 122, similar to FIG. 1A step 110, a scalar to reduce the distance is determined (e.g., from the area of the first triangle or the modified first triangle).

At step 124, the scalar is applied to reduce the distance of the projection. The application of the scalar: (1) changes the triangular surface mesh into a converged triangular surface mesh; (2) the converged triangular surface mesh minimizes one or more objective functions; (3) at least one of the objective functions computes an absolute value of one or more net volumes; and (4) each net volume of the net volumes includes a difference between a fill and cut of earthwork material resulting from modifying the existing triangular surface mesh into the converged triangular surface mesh.

Similar to the steps of FIG. 1A, in FIG. 1B, the scalar may be based on user input, and the determination and application of the scalar may include computing a proximity operator based on the scalar.

Further to the above, in one or more embodiments, the minimization of the objective functions may be based on a proximity operator as set forth in further detail herein.

To better understand the two implementations (minimizing earthwork volumes and minimizing the net volume (i.e., balancing cut and fill volumes), a more detailed description of the proximity operators and actions performed are provided below.

Notation

The notation herein is fairly standard and follows largely [1]. $\mathbb{R}$ denotes the set of real numbers. By "x:=y", or equivalently "y=: x", we mean that "x is defined by y". The assignment operators are denoted by "←" and "→". For a set I, |I| denotes the cardinality of I. The angle between two vectors $\vec{n}$ and $\vec{q}$ is denoted by $\angle(\vec{n}, \vec{q})$.

Volume Between Two Triangles

In construction, the amount for cut-and-fill can be represented by the volume difference between triangles in the original ground and the same triangles in the final design. This amount may be found by considering each triangle in the mesh, then summing up all the quantities.

Figure 2A:
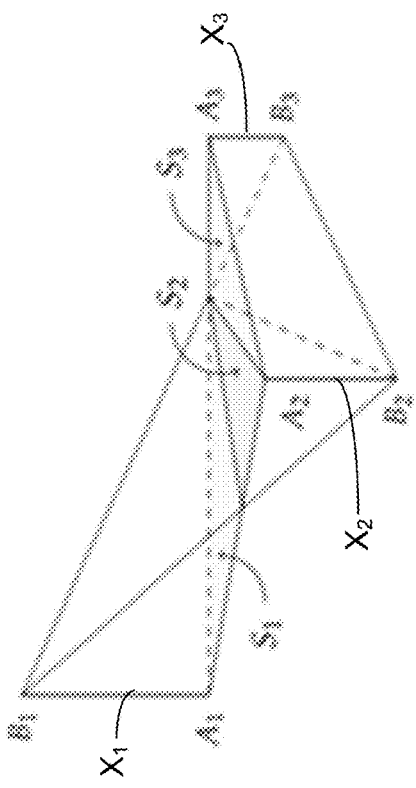
FIGS. 2A and 2B illustrates two alternatives for the volume between two triangles in accordance with one or more embodiments of the invention.
Figure 2B:
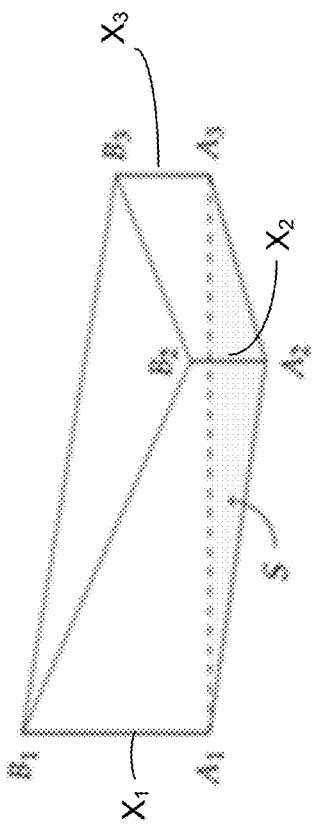

FIGS. 2A and 2B illustrates two alternatives for the volume between two triangles in accordance with one or more embodiments of the invention. Let $A_i=(a_i, b_i, 0)$, i=1, 2, 3, $B_1=(a_1, b_1, x_1)$, $B_2=(a_2, b_2, x_2)$, and $B_3=(a_3, b_3, x_3)$ be given points in $\mathbb{R}^3$. Let V be the volume between two triangles $\Delta A_1 A_2 A_3$ and $\Delta B_1 B_2 B_3$ (see FIGS. 2A and 2B). A formula for V may be derived in terms of $(x_1, x_2, x_3)$.

Let S be the area of the triangle $\Delta A_1 A_2 A_3$. The two cases illustrated in FIGS. 2A and 2B may then be considered since all remaining cases may be derived by using symmetry.

Referring to FIG. 2A, Case 1: $x_1, x_2, x_3 \geq 0$. Accordingly, it is obvious that $$V(x_1, x_2, x_3) = \frac{s}{3}(x_1 + x_2 + x_3). \tag{2}$$

Referring to FIG. 2B, Case 2: $x_1 > 0$, $x_2 \leq 0$, and $x_3 \leq 0$. In this case, vertex "$x_1$" corresponds to fill amount (+), and vertices "$x_2$" and "$x_3$" correspond to cut amount (−).

Figure 2C:
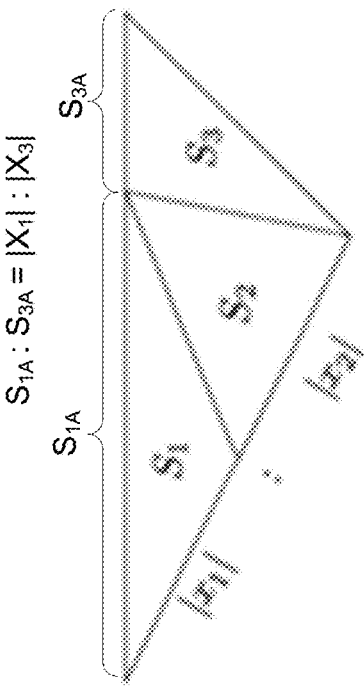
FIG. 2C illustrates the triangle bases $S_1$, $S_2$, and $S_3$ representing the volume between the triangles of FIGS. 2A and 2B in accordance with one or more embodiments of the invention.

Based on the above, V consists of three volumes $V_1$, $V_2$, $V_3$ corresponding to the bases $S_1$, $S_2$, $S_3$, respectively (see FIG. 2B). FIG. 2B shows $S_1$, $S_2$, and $S_3$ with the ratio of the sides. FIG. 2C illustrates the triangle bases $S_1$, $S_2$, and $S_3$ representing the volume between the triangles of FIGS. 2A and 2B in accordance with one or more embodiments of the invention.

In view of FIGS. 2A-2C, one may conclude:

$$\frac{s_1 + s_2}{|x_1|} = \frac{s_3}{|x_3|} = \frac{s}{|x_1| + |x_3|} \Rightarrow S_3 = \frac{|x_3|s}{|x_1| + |x_3|} \text{ and} \tag{3}$$

$$S_1 + S_2 = \frac{|x_1|s}{|x_1| + |x_3|}.$$

It then implies $$\frac{s_1}{|x_1|} = \frac{s_2}{|x_2|} = \frac{s_1+s_2}{|x_1|+|x_2|} = \frac{|x_1|s}{(|x_1|+|x_2|)(|x_1|+|x_3|)}. \quad (4)$$

So $$S_1 = \frac{|x_1|^2 s}{(|x_1|+|x_2|)(|x_1|+|x_3|)} \text{ and} \quad (5)$$

$$S_2 = \frac{|x_1 x_2| s}{(|x_1|+|x_2|)(|x_1|+|x_3|)}$$

So, one may derive the volumes as follows $$V_1 = \frac{1}{3}|x_1| \cdot S_1 = \frac{s}{3} \cdot \frac{x_1^3}{(x_1-x_2)(x_1-x_3)}, \quad (6)$$

$$V_2 = \frac{1}{3}|x_2| \cdot S_2 = \frac{s}{3} \cdot \frac{x_1 x_2^2}{(x_1-x_2)(x_1-x_3)}, \quad (7)$$

$$V_3 = \frac{1}{3}(|x_2|+|x_3|) \cdot S_3 = \frac{s}{3} \cdot \frac{x_3(x_2+x_3)}{(x_1-x_3)}. \quad (8)$$

Thus, the volume is $$V = V_1 + V_2 + V_3 = \frac{s}{3} \cdot \left[\frac{x_1(x_1^2+x_2^2+x_3^2)+x_2 x_3(x_1-x_2-x_3)}{(x_1-x_2)(x_1-x_3)}\right]. \quad (9)$$

Since S is constant, one may focus on $$g(x_1, x_2, x_3) := \frac{x_1(x_1^2+x_2^2+x_3^2)+x_2 x_3(x_1-x_2-x_3)}{(x_1-x_2)(x_1-x_3)}. \quad (10)$$

In summary, embodiments of the invention are interested in the following function (which may define the volume minimization set)

$$f(x_1, x_2, x_3) = \begin{cases} |x_1+x_2+x_3|, & (x_1,x_2,x_3) \in \Omega_0 \cup (-\Omega_0) \\ |g(x_1,x_2,x_3)|, & (x_1,x_2,x_3) \in \Omega_1 \cup (-\Omega_1) \\ |g(x_2,x_3,x_1)|, & (x_1,x_2,x_3) \in \Omega_2 \cup (-\Omega_2) \\ |g(x_3,x_1,x_2)|, & (x_1,x_2,x_3) \in \Omega_3 \cup (-\Omega_3) \end{cases} \quad (11)$$

where $$\Omega_0 := \{(x_1,x_2,x_3) \mid x_1 \geq 0, x_2 \geq 0, x_3 \geq 0\}, \quad (12)$$

$$\Omega_1 := \{(x_1,x_2,x_3) \mid x_1 < 0, x_2 \geq 0, x_3 \geq 0\}, \quad (13)$$

$$\Omega_2 := \{(x_1,x_2,x_3) \mid x_1 \geq 0, x_2 < 0, x_3 \geq 0\}, \quad (14)$$

$$\Omega_3 := \{(x_1,x_2,x_3) \mid x_1 \geq 0, x_2 \geq 0, x_3 < 0\}. \quad (15)$$

That means $\Omega_0$ is the nonnegative orthant and each $\Omega_i$, $i \in \{1, 2, 3\}$, contains points with negative i-th coordinate and nonnegative other coordinates. The function g( ) may provide a volume of cut and fill between the first triangle and a modified first triangle (as described above with respect to FIG. 1).

Figure 3A:
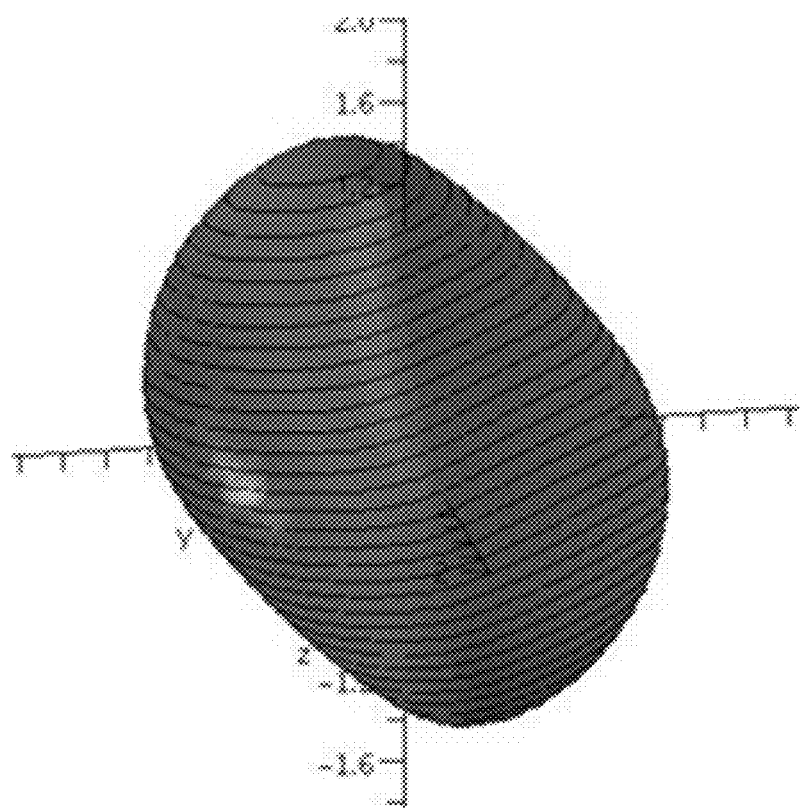
FIGS. 3A and 3B are different orthographic views of a visualization of the volume level set in accordance with one or more embodiments of the invention.
Figure 3B:
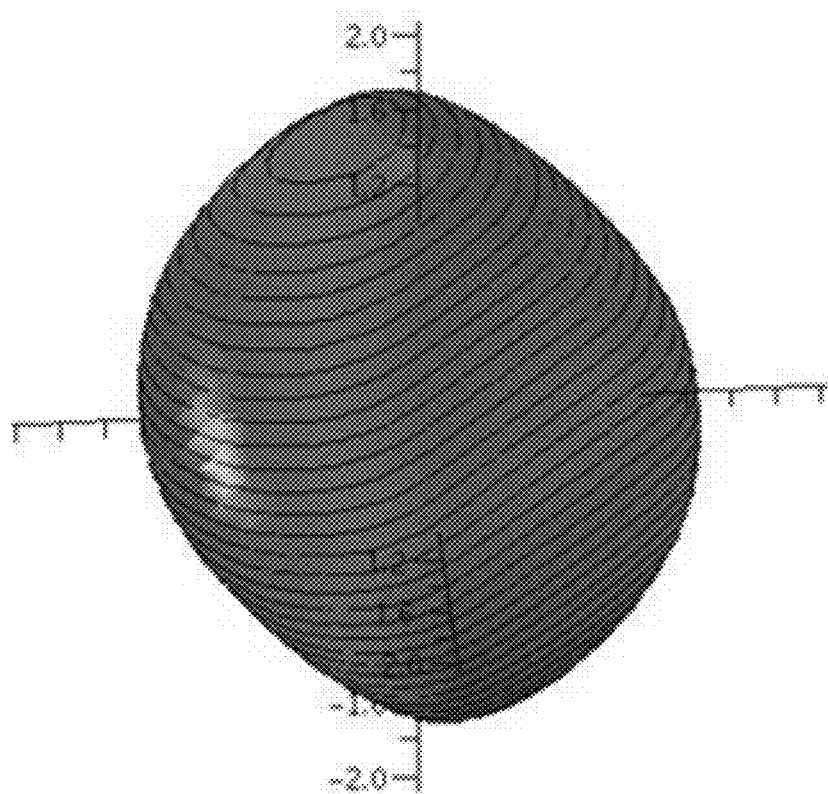

As used herein, the set where function (11) is smaller or equal to one, is referred to as the volume set/spheroid. FIGS. 3A and 3B are different orthographic views of a visualization of the volume set in accordance with one or more embodiments of the invention. In this regard, step 106 of FIG. 1 obtains the volume set which may consist of the spheroid represented by (11) and illustrated in FIGS. 3A and 3B.

It is obvious that (11) is symmetric positively homogeneous. In order to find a volume subgradient set that can be used by the proximity operators, it suffices to show that the function (11) is continuous and convex.

Proposition 6.1 The function $f$ in (11) is continuous on $\mathbb{R}^3$.

Proof. Clearly $f$ is continuous in the interior of each $\Omega_i$ and $-\Omega_i$, $i \in \{0, 1, 2, 3\}$. One needs to show that $f$ is continuous on the boundaries.

First, it is clear that $f$ is continuous on $\Omega_0$ up the boundary.

Next, consider $f$ on $\Omega_1$. We have $$\lim_{\substack{(x_1,x_2,x_3)\to(0,0,0)\\(x_1,x_2,x_3)\in\Omega_1}} f(x_1, x_2, x_3) = 0$$

because for $(x_1, x_2, x_3) \in \Omega_1$, $$0 < f(x_1, x_2, x_3) = \frac{x_1(x_1^2+x_2^2+x_3^2)+x_2 x_3(x_1-x_2-x_3)}{(x_1-x_2)(x_1-x_3)} \leq$$

$$(x_1-x_2-x_3)\frac{x_1(x_1-x_2-x_3)+x_2 x_3}{(x_1-x_2)(x_1-x_3)} = x_1-x_2-x_3.$$

For $\overline{x}_1 > 0$, it is clear that $$\lim_{\substack{(x_1,x_2,x_3)\to(\overline{x}_1,0,0)\\(x_1,x_2,x_3)\in\Omega_1}} f(x_1, x_2, x_3) = x_1.$$

For $\overline{x}_2 < 0$, we have $$\lim_{\substack{(x_1,x_2,x_3)\to(0,\overline{x}_2,0)\\(x_1,x_2,x_3)\in\Omega_1}} f(x_1, x_2, x_3) = -x_2.$$

Indeed, for $(x_1, x_2, x_3) \in \Omega_1$, $$0 < f(x_1, x_2, x_3) + x_2 = \frac{x_1(x_1^2+x_2^2+x_3^2)+x_2 x_3(x_1-x_2-x_3)}{(x_1-x_2)(x_1-x_3)} + x_2 =$$

$$\frac{x_1(x_1^2+x_3^2)x_1 x_2^2 - x_2^2 x_3 + x_2 x_3(x_1-x_3) + (x_1 x_2 - x_2^2)(x_1-x_3)}{(x_1-x_2)(x_1-x_3)} =$$

$$\frac{x_1(x_1^2+x_3^2)}{(x_1-x_2)(x_1-x_3)} + \frac{(x_1-x_3)+(x_2^2+x_2+x_3-x_1 x_2-x_2^2)}{(x_1-x_2)(x_1-x_3)} <$$

$$\frac{x_1^2+x_3^2}{x_1-x_2} + \frac{x_2(x_3-x_1)}{x_1-x_2} \to 0 \text{ as } (x_1, x_3) \to 0.$$

It follows that $f(x_1, x_2, x_3) + \overline{x}_2 = f(x_1, x_2, x_3) + x_2 + (\overline{x}_2 - x_2) \to 0$ as $(x_1, x_2, x_3) \to (0, \overline{x}_2, 0)$.

For $\bar{x}_3<0$, by symmetry, we have $$\lim_{\substack{(x_1,x_2,x_3)\to(0,0,\bar{x}_3) \\ (x_1,x_2,x_3)\in\Omega_1}} f(x_1,x_2,x_3) = -\bar{x}_3.$$

For $\bar{x}_1>0$, $\bar{x}_2<0$, it is clear that $$\lim_{\substack{(x_1,x_2,x_3)\to(\bar{x}_1,\bar{x}_2,0) \\ (x_1,x_2,x_3)\in\Omega_1}} f(x_1,x_2,x_3) = \frac{\bar{x}_1^2+\bar{x}_2^2}{\bar{x}_1-\bar{x}_2}.$$

For $\bar{x}_1>0$, $\bar{x}_3<0$, by symmetry, we have $$\lim_{\substack{(x_1,x_2,x_3)\to(\bar{x}_1,0,\bar{x}_3) \\ (x_1,x_2,x_3)\in\Omega_1}} f(x_1,x_2,x_3) = \frac{\bar{x}_1^2+\bar{x}_3^2}{\bar{x}_1-\bar{x}_3}.$$

For $\bar{x}_2<0$, $\bar{x}_3<0$, it is clear that $$\lim_{\substack{(x_1,x_2,x_3)\to(0,\bar{x}_2,\bar{x}_3) \\ (x_1,x_2,x_3)\in\Omega_1}} f(x_1,x_2,x_3) = -\bar{x}_2-\bar{x}_3.$$

Similarly, we consider $f$ on the remaining regions and conclude that $f$ is continuous on $\mathbb{R}^3$.

Fact 2 (positive semidefinite test) [8, p.~566] A matrix $H\in \mathbb{R}^{n\times n}$ is positive semidefinite if and only if all of its principle minors are nonnegative. Recall that for a square matrix $H\in \mathbb{R}^{n\times n}$, an r×r principle submatrix is a submatrix of H that lies on the same set of r rows and columns, and an r×r principle minor is the determinant of an r×r principle submatrix.

Proposition 6.3 Let $\Omega_i$, $i\in\{0,1,2,3\}$, be given by (4). The function $f$ in (11) is convex on each $\Omega_i$.

Proof. It is clear that $f$ is convex on $\Omega_0$. It suffices to prove that $f$ is convex on $\Omega_1$. Clearly $f$ is twice differentiable on $\Omega_1$. Let $H(x_1, x_2, x_3)$ be the Hessian of $f$. Denote $H_I$ the principle submatrix of H with respect to rows and columns in the index set I. One can check that $$\det H_{\{1\}} = \frac{4x_1^3(x_2^2+x_2x_3+x_3^2)+3x_2x_3(x_2x_3-x_1x_2-x_1x_3)}{(x_1-x_2)(x_1-x_3)} \geq 0, \quad (19)$$

$$\det H_{\{2\}} = \frac{4x_1^3}{(x_1-x_2)^3(x_1-x_3)} \geq 0, \quad (20)$$

$$\det H_{\{3\}} = \frac{4x_1^3}{(x_1-x_2)(x_1-x_3)^3} \geq 0, \quad (21)$$

$$\det H_{\{1,2\}} = \frac{12x_1^4x_3^2}{(x_1-x_2)^4(x_1-x_3)^4} \geq 0, \quad (22)$$

$$\det H_{\{1,3\}} = \frac{12x_1^4x_2^2}{(x_1-x_2)^4(x_1-x_3)^4} \geq 0, \quad (23)$$

-continued $$\det H_{\{2,3\}} = \frac{12x_1^6}{(x_1-x_2)^4(x_1-x_3)^4} > 0, \quad (24)$$

$$\det H = 0. \quad (25)$$

Thus, by Fact 2, $H(x_1, x_2, x_3)$ is positive semidefinite for all $(x_1, x_2, x_3)\in\text{int}\Omega_1$. It follows that $f$ is convex on $\Omega_1$.

Theorem 6.4 The function $f$ in (11) is convex on $\mathbb{R}^3$.

Proof. One can certainly check that the gradient of $f$ is continuous at every point except the origin. Thus, $f$ is convex by [4, Theorem~5.5].

Figure 4A:
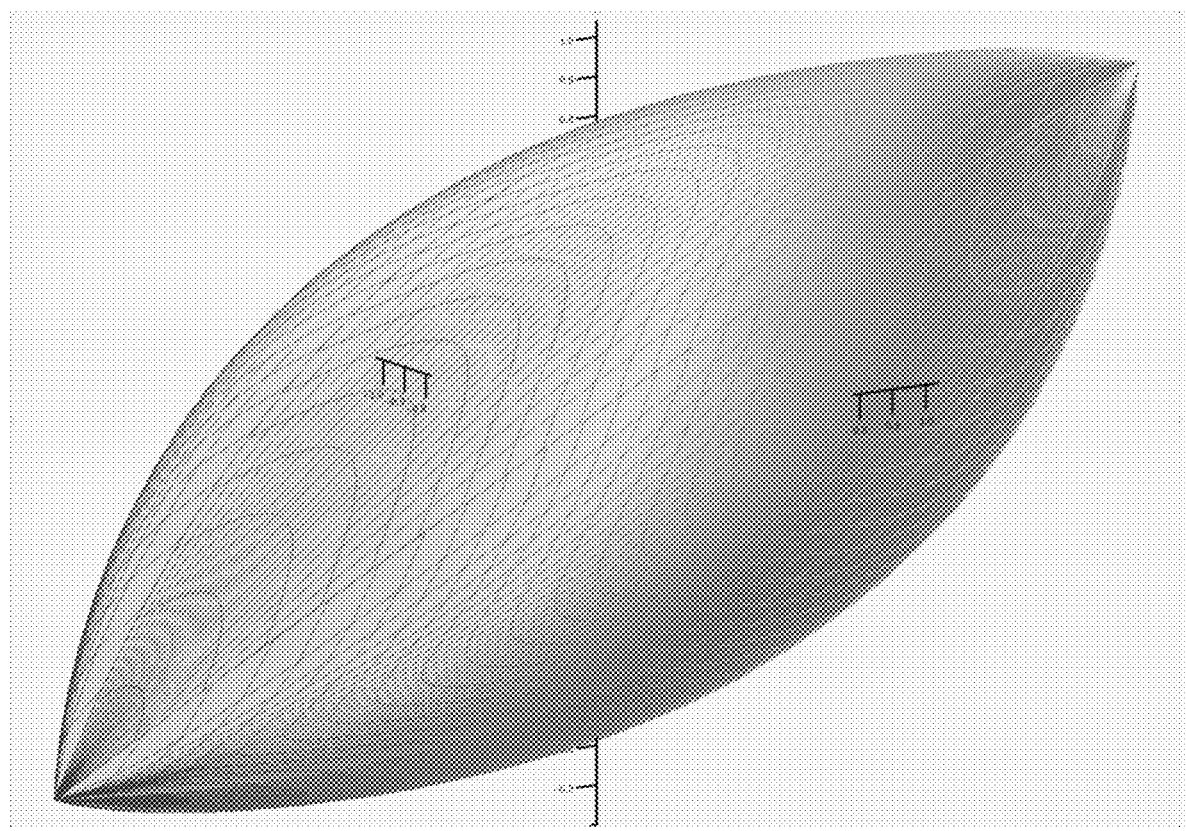
FIGS. 4A and 4B are different orthographic views of a visualization of the volume subgradient set in accordance with one or more embodiments of the invention.
Figure 4B:
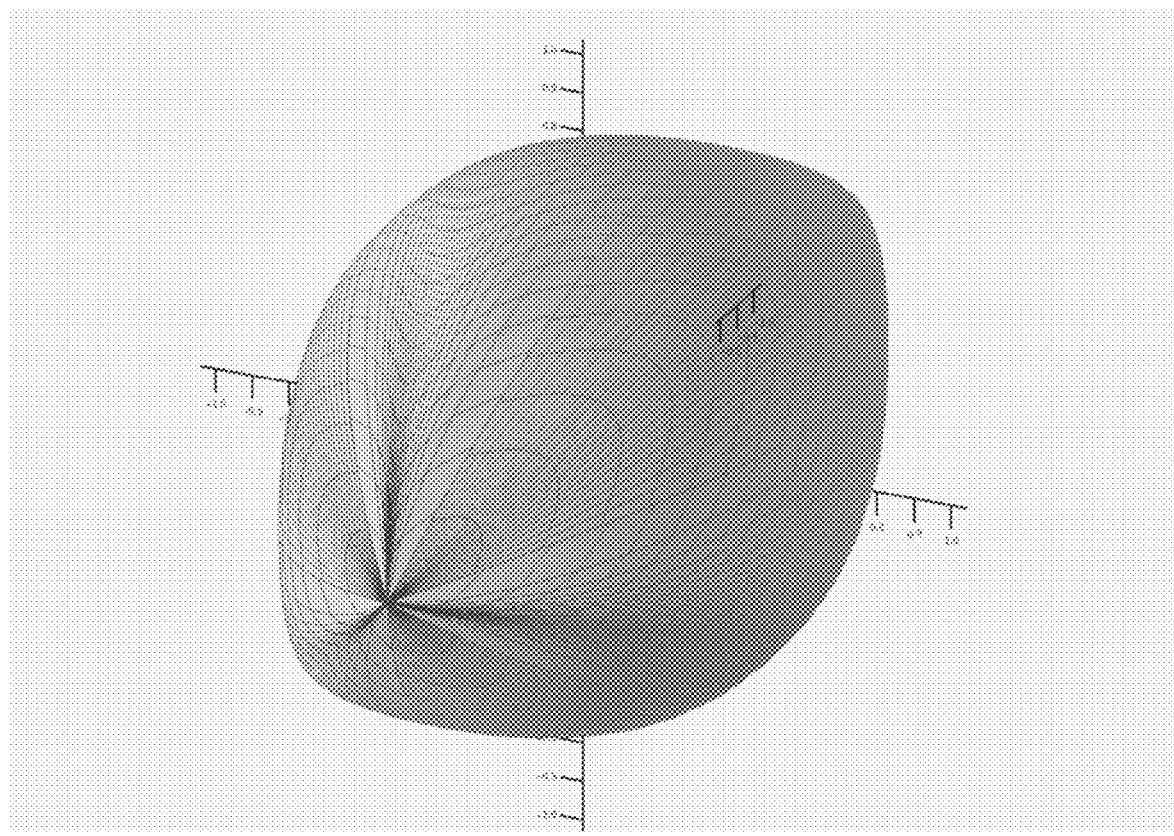

Since $f$ is convex, one can obtain the gradient set $\nabla f$ of $f$. In embodiment of the invention, that set is shown in FIGS. 4A and 4B. This set looks like a football and is called the volume subgradient set. A proximity operator may then project one or more heights of a triangle to its volume gradient set, in order to minimize the earthwork volumes.

Polyhedral Upper Approximation

Embodiments of the invention present a simple way to (upper) approximate the volume function by a polyhedral function. Of course, it is possible to refine this estimation or use different ways to approximate the function by polyhedral functions.

Theorem 7.1 For all $(x_1,x_2,x_3)\in\mathbb{R}^3$ $$f(x_1,x_2,x_3)\leq\max\{|x_1|,|x_2|,|x_3|,+x_2|,|x_2+x_3|,|x_3+x_1|,|x_1+x_2+x_3|\}=:\Phi(x_1,x_2,x_3). \quad (26)$$

Proof. For $(x_1, x_2, x_3)\in\Omega_1$, we have $$x_1(x_1^2+x_2^2+x_3^2)+x_2x_3(x_1-x_2-x_3)=|x_1|(x_1^2+x_2^2+x_3^2)+x_2x_3|x_1|+x_2x_3|x_2+x_3| \quad (27)$$

$$\leq |x_1|x_1^2+|x_1|(x_2+x_3)^2+x_2x_3|x_2+x_3| \quad (28)$$

$$\leq \max\{|x_1|,|x_2+x_3|\}(x_1^2+x_1|x_2+x_3|+x_2x_3) \quad (29)$$

$$= \max\{|x_1|,|x_2+x_3|\}(x_1-x_2)(x_1-x_3). \quad (30)$$

Thus, $f(x_1, x_2, x_3)\leq\max\{|x_1|, |x_2+x_3|\}\leq\Phi(x_1, x_2, x_3)$ on $\Omega_1$. All other cases are similar.

Now, suppose $z=(z_1, \ldots, z_n)$ is the original elevations on the triangular mesh and $x=(x_1, \ldots, x_n)$ is a feasible design for the mesh. This generates a volume difference over each triangle $\Delta$ in the mesh. So the total volume difference is $$V(x,z)=\Sigma_{alltriangles\Delta}\text{Volume difference over} \\ \Delta\leq\Sigma_{alltriangles\Delta}\gamma_\Delta\Phi_\Delta=\Phi(x,z), \quad (31)$$

where $\Phi_\Delta$ is the volume upper estimation for triangle $\Delta$ using formula (26).

FIGS. 5A and 5B illustrate two orthographic views of the volume set of a polyhedral upper approximation of the volume function. The volume set in FIGS. 5A and 5B are here referred to as the approximate volume level set. One can see that the approximate volume level set (FIGS. 5A and 5B) is contained in the original volume level set (FIGS. 3A and 3B).

From the approximate volume level set in FIGS. 5A and 5B, the subgradient set is computed. This subgradient set is shown in FIGS. 6A and 6B. In embodiments of the invention, the approximate volume subgradient set may be referred to herein simply as the approximate set. In this regard, in one or more embodiments, step 108 of FIG. 1 includes computing the approximate set of the football norm (i.e., the volume subgradient set). Such an approximate set may be represented by the ortographic views illustrated in FIGS. 6A and 6B. In addition, such an approximate set may be represented by a variety of geoemtric shapes including, for example, a convex hull.

Theorem 7.2 Let $\{u_i\}_{i \in I}$ be a system of finitely many vectors in $\mathbb{R}^n$, and $$f: \mathbb{R}^n \to \mathbb{R}: x \to \max_{i \in I}\{|\langle u_i, x \rangle|\}. \quad (32)$$

Then $f^* = \iota_D$ where $D := \text{conv } U_{i \in I}\{u_i, -u_i\}$. Consequently, $\text{Prox}_f = \text{Id} - P_D$.

Theorem 7.3 Consider $$\Phi(x_1, x_2, x_3) := \max\{|x_1|, |x_2|, |x_3|, |x_1 + x_2|, |x_2 + x_3|, |x_3 + x_1|, |x_1 + x_2 + x_3|\}. \quad (33)$$

Then $\Phi^* = \iota_D$ where D is the dual ball of the norm $\Phi$ and is given by $$D := \text{conv}\{\pm e_1, \pm e_2, \pm e_3, \pm(e_1 + e_2), \pm(e_2 + e_3), \pm(e_3 + e_1), \pm(e_1 + e_2 + e_3)\}, \quad (34)$$

where $e_1 := (1,0,0)$, $e_2 := (0,0,1)$, $e_3 := (0,0,1)$ are standard unit vectors in $\mathbb{R}^3$. Furthermore, the proximity operator of (33) is $$\text{Prox}_\Phi = \text{Id} - \text{Prox}_{\Phi^*} = \text{Id} - P_D, \quad (35)$$

where $P_D$ is the projection onto the dual ball D.

Figure 7A:
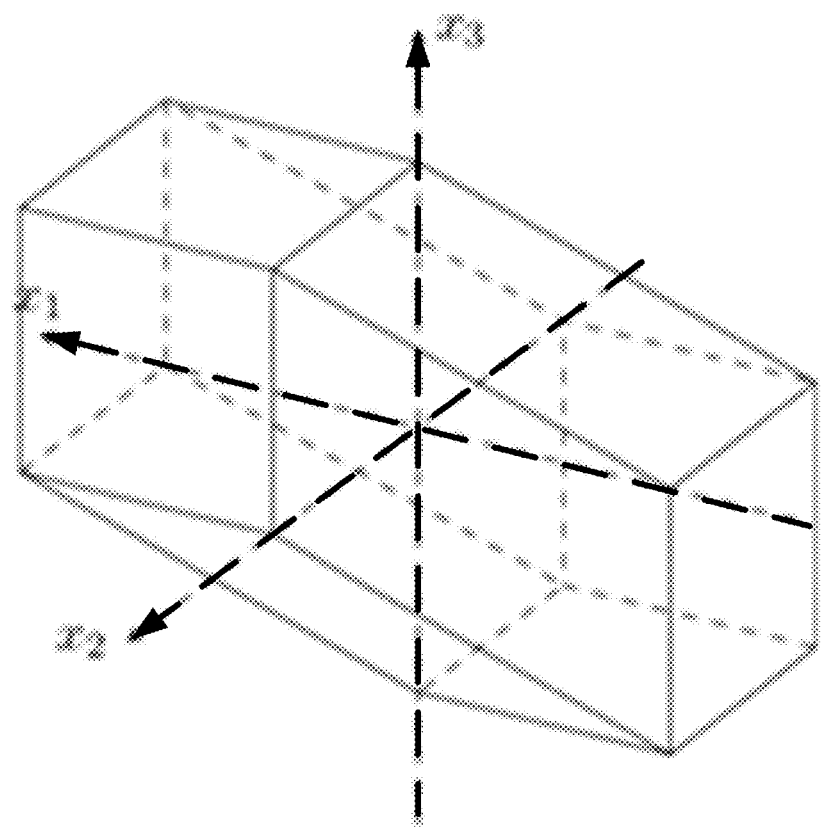
FIG. 7B illustrates the set $D_1:=D \cap (-\Omega_1)$ of the approximate volume subgradient set in accordance with one or more embodiments of the invention.
Figure 7B:
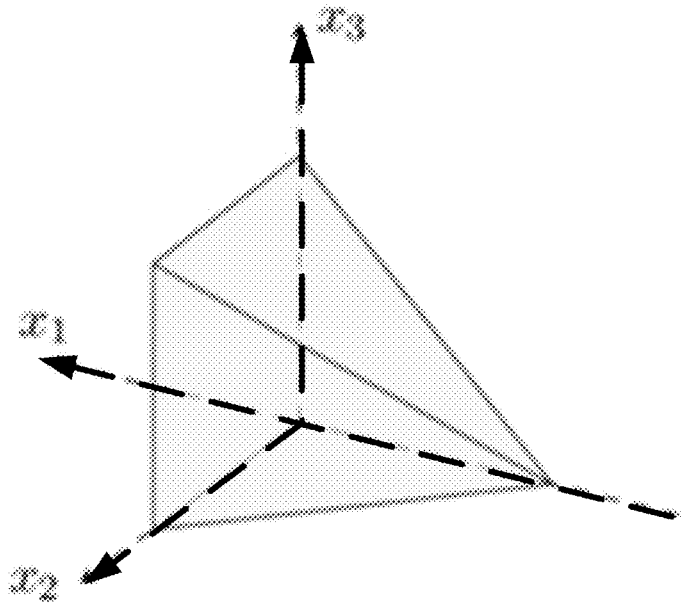

FIGS. 7A and 7B are two visualizations of the dual ball (34) in $\mathbb{R}^3$.

One can aim to minimizes the upper approximation $\Phi(x, z)$ over all the constraints. Thanks to the available proximity operator for each term $\Phi_\Delta$ from Theorem 7.2 and 7.3, one can apply any optimization methods that use this formula. The Projection $P_D$ To compute the projection $P_D$ (i.e., in step 110 of FIG. 1), one may use the eight orthants $\Omega_0, \ldots, \Omega_3, -\Omega_0, \ldots, -\Omega_3$, defined in Eq. (11) above. Let $D = \{D_0 \cup D_1 \cup \ldots \cup D_3 \cup -D_0 \cup \ldots \cup -D_3\}$, where subset $D_i \subset \Omega_i$ and $-D_i \subset -\Omega_i$, for $i = 0, 1, 2, 3$.

FIG. 7A illustrates the set D in $\mathbb{R}^3$ in accordance with one or more embodiments of the invention. FIG. 7B illustrates the set $D_1 := D \cap (-\Omega_1)$ in accordance with one or more embodiments of the invention.

Projection onto $D_0$ and $-D_0$

As $D_0 = \{1 \geq x_1, x_2, x_3 \geq 0\}$ is a unit cube $\Omega_0$ with one vertex at the origin, one uses the projection $$P_{D_0}(x_1, x_2, x_3) = \min(1, x_i), i = 1, 2, 3, \quad (36)$$

whenever $x_1, x_2, x_3 \in \Omega_0$. As $-D_0$ is the negative, symmetric counter part to $D_0$, one uses $$P_{-D_0}(x_1, x_2, x_3) = \min(-1, x_i), i = 1, 2, 3, \quad (37)$$

whenever $x_1, x_2, x_3 \in -\Omega_0$.

From FIG. 7A, one can see that all the other subsets are oblique pyramids that are symmetric (see FIG. 7B). It is therefore sufficient to derive the projection for $D_1$, and then switch coordinates accordingly to obtain the other projections.

Projection onto $D_1$

If $x = (x_1, x_2, x_3) \in \Omega_1$, there are three cases.

Case 1: $x_3 - x_1 \leq 1$ and $x_2 - x_1 \leq 1$, then $x \in D_1$ and $P_D(x) = x$.

Case 2: $x \in (\mathbb{R}_- \times \mathbb{R}_+^2) \setminus D_1$ with $x_2 \geq x_3$. This means one wants to project to the pyramid face with the base line from $(0,1,0)$ to $(0,1,1)$, using $a = -e_1 + e_2$ and $$p := (p_1, p_2, p_3) := x + \left(\frac{1 - \langle a, x \rangle}{\|a\|^2}\right)a.$$

As this is a projection onto a hyperplane, p may now lay outside $\Omega_1$. If $p_1 > 0$, then $p \in \Omega_0$ and letting $p \leftarrow (0, 1, \min\{1, p_3\})$ will shift it back to the pyramid base. If $p_3 > p_1 + 1$, then p is above the pyramid edge $1 - x_1$. In this case, one wants to project x directly onto the edge defined by $a = -e_1 = (-1, 0, 0)$ and $b = (0, 1, 1)$. So $$t = \frac{\langle x - a, b - a \rangle}{\|b - a\|^2} = \frac{\langle x + e_1, e_1 + e_2 + e_3 \rangle}{3}$$

$$p := P_{[a,b]} = a + \lambda(b - a) = -e_1 + P_{[0,1]}(t)(e_1 + e_2 + e_3)$$

Case 3: $x \in (\mathbb{R}_- \times \mathbb{R}_+^2) \setminus D_1$ with $x_3 > x_2$. This means one wants to project to the pyramid face with the base line from $(0,1,1)$ to $(0,0,1)$, using $a = -e_1 + e_3$. The rest is similar to case 2.

Pseudo Code for $P_{D_1}$

---

1) If $x_3 - x_1 \leq 1$ and $x_2 - x_1 \leq 1$ then $x \in D_1$. Then DONE.
2) If $x = (x_1, x_2, x_3) \in (\mathbb{R}_- \times \mathbb{R}_+^2) \setminus D_1$ with $x_2 \geq x_3$.

Define $a = -e_1 + e_2$ and $p := (p_1, p_2, p_3) := x + \left(\frac{1 - \langle a, x \rangle}{\|a\|^2}\right)a$.

if         $p_1 > 0$ then
             $p = (0, 1, \min\{1, p_3\})$
elseif   $p_3 > p_1 + 1$ then
             $t = \langle x + e_1, e_1 + e_2 + e_3 \rangle / 3$,
             $t \leftarrow \max\{0, \min\{1, t\}\}$,
             $p = -e_1 + t(e_1 + e_2 + e_3)$.
endif
Output: p. DONE.

3) If $x = (x_1, x_2, x_3) \in (\mathbb{R}_- \times \mathbb{R}_+^2) \setminus D_1$ with $x_3 > x_2$.

Define $a = -e_1 + e_3$ and $p := (p_1, p_2, p_3) := x + \left(\frac{1 - \langle a, x \rangle}{\|a\|^2}\right)a$.

if         $p_1 > 0$ then
             $p = (0, \min\{1, p_2\}, 1)$
elseif   $p_2 > p_1 + 1$ then
             $t = \langle x + e_1, e_1 + e_2 + e_3 \rangle / 3$,
             $t \leftarrow \max\{0, \min\{1, t\}\}$,
             $p = -e_1 + t(e_1 + e_2 + e_3)$.
endif
Output: p. DONE.

---

Projections for Each Orthant

As the pyramidal subsets are all symmetric, one can reuse $P_{D_1}$ for the other subsets by switching variables.

Based thereon, one is ready to construct $P_D$:

$$P_D(x_1, x_2, x_3) = \begin{cases} x, & x \in D, \\ \min(1, x_i), i = 1, 2, 3, & x \in \Omega_0, \\ -\min(1, -x_i), i = 1, 2, 3, & x \in -\Omega_0, \\ P_{D_1}(x_1, x_2, x_3), & x \in \Omega_1, \\ -P_{D_1}(-x_1, -x_2, -x_3), & x \in -\Omega_1, \\ P_{D_1}(x_2, x_1, x_3), x_1 \leftrightarrow x_2 & x \in \Omega_2, \\ -P_{D_1}(-x_2, -x_1, -x_3), x_1 \leftrightarrow x_2 & x \in -\Omega_2, \\ P_{D_1}(x_3, x_2, x_1), x_1 \leftrightarrow x_3 & x \in \Omega_3, \\ -P_{D_1}(-x_3, -x_2, -x_1), x_1 \leftrightarrow x_3 & x \in -\Omega_3, \end{cases} \quad (38)$$

where the minimum is taken coordinate-wise.

In view of the above, a scalar is applied to the projection in order to minimize an objective function that computes an absolute earthwork volume for the mesh (when designing a surface). Subsequent to applying the projection to design a surface, the actual surface may be constructed based on the design (e.g., by minimizing the computation of the absolute earthwork volume thereby minimizing the costs associated with the earthwork volume).

Proximity Operator to Minimize Earthwork Volumes

Given $z^0 \in \mathbb{R}^3$ and $\alpha \in \mathbb{R}_+$, let $h(x):=\alpha\Phi(x-z^0)$, then by [3, Lemma~2.3], $$Prox_h(x) = z^0 + \alpha Prox_\Phi\left(\frac{z-z^0}{\alpha}\right) \quad (39)$$

$$= z^0 + \alpha\left(\frac{z-z^0}{\alpha} - P_D\left(\frac{z-z^0}{\alpha}\right)\right) \quad (40)$$

$$= z - \alpha P_D\left(\frac{z-z^0}{\alpha}\right) \quad (41)$$

One can now state the final proximity operator for (33).

Let $z^0 \in \mathbb{R}^3$ be elevation points of a triangle in an existing triangular mesh. Let S be the surface area of that same triangle, $z \in \mathbb{R}^3$ be some new elevation values, and $\gamma \in \mathbb{R}$, $\gamma > 0$ be a weight for the volume minimization objective. In order to minimize the volumes using the proximity operator, one can perform the following steps.

1) Initialize $$\alpha \leftarrow S/3$$

$$x \leftarrow = \frac{z-z^0}{\gamma\alpha}.$$

2) Let $p=P_D(x)$ using (38).
3) Return $z-\gamma\alpha p$.

Net Volume Between Triangles

In site construction, earthwork volumes in some areas need to be cut, and in other areas volumes need to be filled. For a designer or civil engineer, it is important for them to have the ability to reuse the volumes that get cut in the areas where fill is needed. Bringing into a construction site material for a fill, or hauling out of the construction site material from a cut, is generally a very expensive task. Hence the balancing of cut and fill volumes among the construction site is desirable.

When describing the volume between triangles (above), the absolute volumes between triangles were examined. In this section, embodiments of the invention describe the balancing of cut and fill volumes. The difference in cut and fill volumes is also called the net volume between triangles. The net volume is the sum of all cut and fill volumes, where cut is positive and fill is negative. Hence, only Case 1 in the Volume Between Triangles section above applies. To balance cut and fill volumes, it is desirable to minimize the function:

$$f = \left|\sum_{t=1}^{n} V_t\right|,$$

where t is a triangle and n is the number of all triangles, and where the net volume of the triangle t is calculated as in Case 1 above:

$$V(x_1, x_2, x_3) = \frac{S}{3}(x_1 + x_2 + x_3).$$

It follows that one can rewrite function $f$ in the more general form:

$$f = |\langle a, x \rangle|,$$

where a is a vector of constants reflecting the area parts of S/3, and x are the elevation differences of the triangle vertices.

Proximity Operator to Balance Cut and Fill

Consider Lemma 6.68 in [11]. Using the function $f=|\langle a, x\rangle|$, and for $\lambda > 0$ the proximity operator becomes:

$$Prox_{\lambda f} = \begin{cases} x - \frac{\langle a, x \rangle}{\|a\|_2}a, & \text{if } |\langle a, x \rangle| \le \lambda\|a\|_2, \\ x - \frac{\langle a, x \rangle}{(\|a\|^2 + \alpha^*)}a, & \text{otherwise,} \end{cases}$$

where $$\alpha^* = \frac{|\langle a, x\rangle| - \lambda\|a\|^2}{\lambda}.$$

With such a proximity operator, a contains the scalar from the area of the first triangle, x contains the height of one or more vertices between the first triangle and the modified first triangle, and Δ is a user input weight for the objective function.

In view of the above, a proximity operator may be utilized as part of an objective to balance the cut and fill when designing a surface (e.g., as set forth in FIG. 1B above). Subsequent to applying the proximity operator to design a surface, the actual surface may be constructed based on the design (e.g., by balancing the cut and fill thereby minimizing the costs associated with the cut and fill).

Hardware Environment

Figure 8:
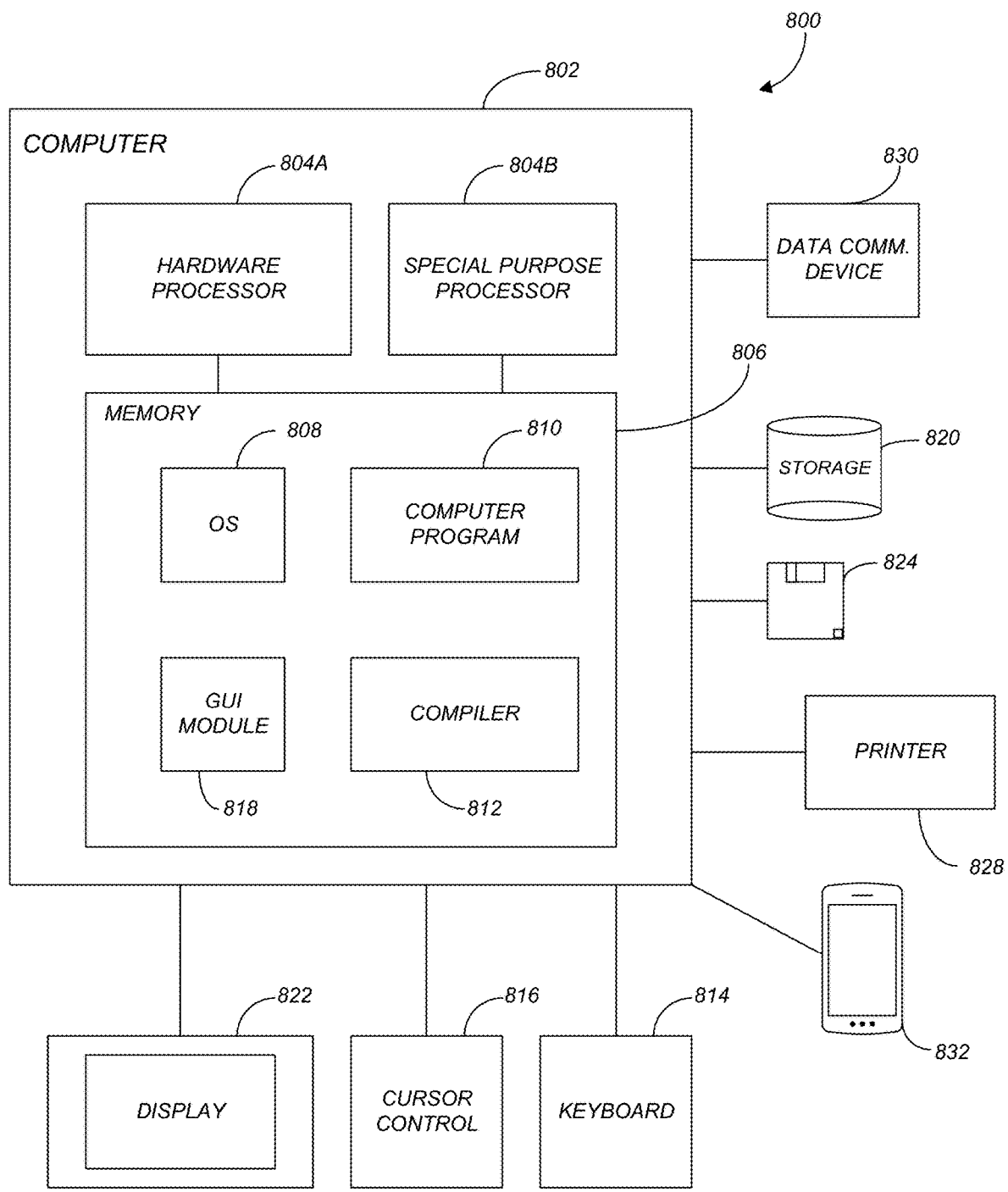
FIG. 8 is an exemplary hardware and software environment used to implement one or more embodiments of the invention.

FIG. 8 is an exemplary hardware and software environment 800 (referred to as a computer-implemented system and/or computer-implemented method) used to implement one or more embodiments of the invention. The hardware and software environment include a computer 802 and may include peripherals. Computer 802 may be a user/client computer, server computer, or may be a database computer. The computer 802 comprises a hardware processor 804A and/or a special purpose hardware processor 804B (hereinafter alternatively collectively referred to as processor 804) and a memory 806, such as random access memory (RAM). The computer 802 may be coupled to, and/or integrated with, other devices, including input/output (I/O) devices such as a keyboard 814, a cursor control device 816 (e.g., a mouse, a pointing device, pen and tablet, touch screen, multi-touch device, etc.) and a printer 828. In one or more embodiments, computer 802 may be coupled to, or may comprise, a portable or media viewing/listening device 832 (e.g., an MP3 player, IPOD, NOOK, portable digital video player, cellular device, personal digital assistant, etc.). In yet another embodiment, the computer 802 may comprise a multi-touch device, mobile phone, gaming system, internet enabled television, television set top box, or other internet enabled device executing on various platforms and operating systems.

In one embodiment, the computer 802 operates by the hardware processor 804A performing instructions defined by the computer program 810 (e.g., a computer-aided design [CAD] application) under control of an operating system 808. The computer program 810 and/or the operating system 808 may be stored in the memory 806 and may interface with the user and/or other devices to accept input and commands and, based on such input and commands and the instructions defined by the computer program 810 and operating system 808, to provide output and results.

Output/results may be presented on the display 822 or provided to another device for presentation or further processing or action. In one embodiment, the display 822 comprises a liquid crystal display (LCD) having a plurality of separately addressable liquid crystals. Alternatively, the display 822 may comprise a light emitting diode (LED) display having clusters of red, green and blue diodes driven together to form full-color pixels. Each liquid crystal or pixel of the display 822 changes to an opaque or translucent state to form a part of the image on the display in response to the data or information generated by the processor 804 from the application of the instructions of the computer program 810 and/or operating system 808 to the input and commands. The image may be provided through a graphical user interface (GUI) module 818. Although the GUI module 818 is depicted as a separate module, the instructions performing the GUI functions can be resident or distributed in the operating system 808, the computer program 810, or implemented with special purpose memory and processors.

In one or more embodiments, the display 822 is integrated with/into the computer 802 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 802 according to the computer program 810 instructions may be implemented in a special purpose processor 804B. In this embodiment, some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 810 instructions. In one embodiment, the special purpose processor 804B is an application specific integrated circuit (ASIC).

The computer 802 may also implement a compiler 812 that allows an application or computer program 810 written in a programming language such as C, C++, Assembly, SQL, PYTHON, PROLOG, MATLAB, RUBY, RAILS, HASKELL, or other language to be translated into processor 804 readable code. Alternatively, the compiler 812 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 810 accesses and manipulates data accepted from I/O devices and stored in the memory 806 of the computer 802 using the relationships and logic that were generated using the compiler 812.

The computer 802 also optionally comprises an external communication device such as a modem, satellite link, Ethernet card, or other device for accepting input from, and providing output to, other computers 802.

In one embodiment, instructions implementing the operating system 808, the computer program 810, and the compiler 812 are tangibly embodied in a non-transitory computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of computer program 810 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 810 and/or operating instructions may also be tangibly embodied in memory 806 and/or data communications devices 830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 802.

Figure 9:
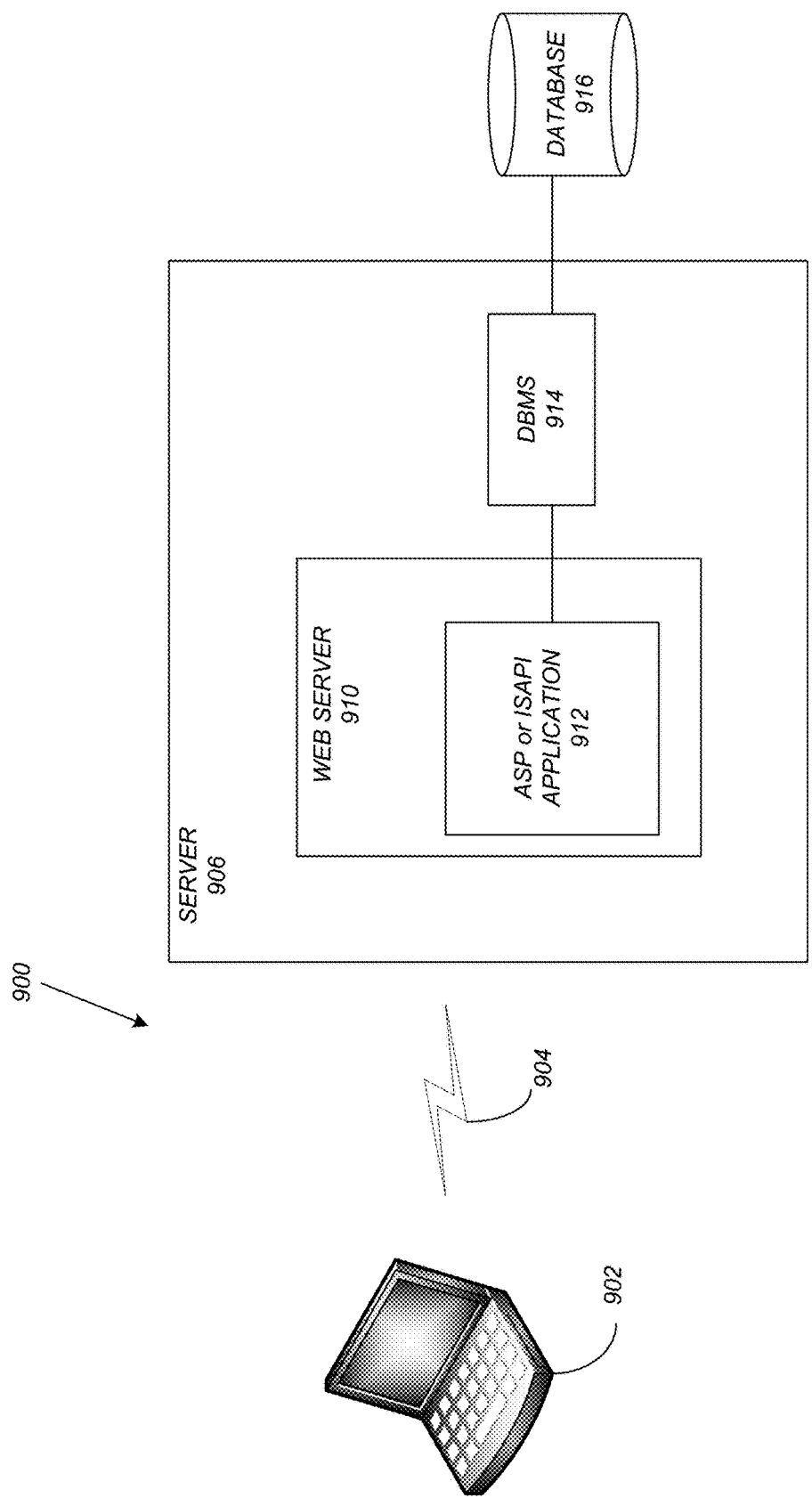
FIG. 9 schematically illustrates a typical distributed/cloud-based computer system in accordance with one or more embodiments of the invention.

FIG. 9 schematically illustrates a typical distributed/cloud-based computer system 900 using a network 904 to connect client computers 902 to server computers 906. A typical combination of resources may include a network 904 comprising the Internet, LANs (local area networks), WANs (wide area networks), SNA (systems network architecture) networks, or the like, clients 902 that are personal computers or workstations (as set forth in FIG. 8), and servers 906 that are personal computers, workstations, minicomputers, or mainframes (as set forth in FIG. 8). However, it may be noted that different networks such as a cellular network (e.g., GSM [global system for mobile communications] or otherwise), a satellite based network, or any other type of network may be used to connect clients 902 and servers 906 in accordance with embodiments of the invention.

A network 904 such as the Internet connects clients 902 to server computers 906. Network 904 may utilize ethernet, coaxial cable, wireless communications, radio frequency (RF), etc. to connect and provide the communication between clients 902 and servers 906. Further, in a cloud-based computing system, resources (e.g., storage, processors, applications, memory, infrastructure, etc.) in clients 902 and server computers 906 may be shared by clients 902, server computers 906, and users across one or more networks. Resources may be shared by multiple users and can be dynamically reallocated per demand. In this regard, cloud computing may be referred to as a model for enabling access to a shared pool of configurable computing resources.

Clients 902 may execute a client application or web browser and communicate with server computers 906 executing web servers 910. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 902 may be downloaded from server computer 906 to client computers 902 and installed as a plug-in or ACTIVEX control of a web browser. Accordingly, clients 902 may utilize ACTIVEX components/component object model (COM) or distributed COM (DCOM) components to provide a user interface on a display of client 902. The web server 910 is typically a program such as MICROSOFT'S INTERNET INFORMATION SERVER.

Web server 910 may host an Active Server Page (ASP) or Internet Server Application Programming Interface (ISAPI) application 912, which may be executing scripts. The scripts invoke objects that execute business logic (referred to as business objects). The business objects then manipulate data in database 916 through a database management system (DBMS) 914. Alternatively, database 916 may be part of, or connected directly to, client 902 instead of communicating/obtaining the information from database 916 across network 904. When a developer encapsulates the business functionality into objects, the system may be referred to as a component object model (COM) system. Accordingly, the scripts executing on web server 910 (and/or application 912) invoke COM objects that implement the business logic. Further, server 906 may utilize MICROSOFT'S TRANSACTION SERVER (MTS) to access required data stored in database 916 via an interface such as ADO (Active Data Objects), OLE DB (Object Linking and Embedding DataBase), or ODBC (Open DataBase Connectivity).

Generally, these components 900-916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 902 and 906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 902 and 906. Embodiments of the invention are implemented as a software/CAD application on a client 902 or server computer 906. Further, as described above, the client 902 or server computer 906 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

The following references are incorporated by reference herein:

[1] H. H. Bauschke and P. L. Combettes, *Convex Analysis and Monotone Operator Theory in Hilbert Spaces*, Springer (2011).

[2] H. H. Bauschke, V. R. Koch, Projection methods: Swiss Army knives for solving feasibility and best approximation problems with halfspaces. *Proc. Workshop Infinite Products of Operators and Their Applications* (S. Reich, A. Zaslayski, eds.) (American Mathematical Society, Providence, R.I.), 1-40.

[3] H. H. Bauschke, V. R. Koch, and H. M. Phan, Stadium norm and Douglas-Rachford splitting: a new approach to road design optimization, *Operations Research* 64 (2016), 201-218.

[4] H. H. Bauschke, Y. Lucet, and H. M. Phan, On the convexity of piecewise-defined functions, *ESAIM: Control, Optimisation and Calculus of Variations* 22 (2016), 728-742

[5] P. L. Combettes and J.-C. Pesquet, Proximal splitting methods in signal processing, in *Fixed-Point Algorithms for Inverse Problems in Science and Engineering*, H. H. Bauschke et al. (editors), Springer, 2011, pp. 185-212.

[6] J. Douglas and H. H. Rachford, On the numerical solution of heat conduction problems in two and three space variables, *Transactions of the AMS* 82 (1956), pp. 421-439.

[7] P.-L. Lions and B. Mercier, Splitting algorithms for the sum of two nonlinear operators, *SIAM Journal on Numerical Analysis* 16 (1979), pp. 964-970.

[8] C. D. Meyer, *Matrix Analysis and Applied Linear Algebra*, SIAM (2000).

[9] J.-J. Moreau, Proximité et dualité dans un espace hilbertien, *Bulletin de la Societé Mathematique de France* 93 (1965), pp. 273-299.

[10] R. T. Rockafellar, *Convex Analysis*, Princeton University Press (1970).

[11] A. Beck, *First-Order Methods in Optimization*, SIAM (2017)

What is claimed is:

1. A computer-implemented method for designing a surface, comprising:

(a) obtaining, in a computer, an existing triangular surface mesh representative of an existing surface, wherein the existing triangular surface mesh comprises a first triangle and one or more additional triangles connected by vertices and edges;

(b) receiving a modification to the first triangle in compliance with one or more design constraints, resulting in a modified first triangle;

(c) obtaining a volume level set, in Euclidean space, for the modified first triangle;
(d) obtaining a volume subgradient set based on the volume level set, in the Euclidean space;
(e) determining a scalar from the area of the first triangle or the modified first triangle;
(f) scaling heights between the vertices of the modified first triangle and the first triangle using the scalar;
(g) computing a projection, of one or more scaled heights of the vertices of the modified first triangle onto the volume subgradient set;
(h) scaling the projection using the scalar;
(i) removing the scaled projection from the vertices of the modified first triangle, wherein:
  (i) the removing changes the triangular surface mesh into a converged triangular surface mesh;
  (ii) the converged triangular surface mesh minimizes one or more objective functions;
  (iii) one or more of the objective functions computes an absolute earthwork volume between the first triangle on the existing surface and the modified first triangle on the converged triangular surface mesh; and
(j) rendering the converged triangular surface mesh in a computer-aided design (CAD) application, wherein the existing surface is modified during construction based on the converged triangular surface mesh.

2. The computer-implemented method of claim 1 wherein:
the scalar is based on user input;
the determining the scalar comprises computing a proximity operator based on the scalar.

3. The computer-implemented method of claim 1 wherein the volume minimization set is defined by a function f:

$$f(x_1, x_2, x_3) = \begin{cases} |x_1 + x_2 + x_3|, & (x_1, x_2, x_3) \in \Omega_0 \cup (-\Omega_0) \\ |g(x_1, x_2, x_3)|, & (x_1, x_2, x_3) \in \Omega_1 \cup (-\Omega_1) \\ |g(x_2, x_3, x_1)|, & (x_1, x_2, x_3) \in \Omega_2 \cup (-\Omega_2) \\ |g(x_3, x_1, x_2)|, & (x_1, x_2, x_3) \in \Omega_3 \cup (-\Omega_3) \end{cases}$$

where $\Omega_0 := \{(x_1, x_2, x_3) \mid x_1 \geq 0, x_2 \geq 0, x_3 \geq 0\},$ $\Omega_1 := \{(x_1, x_2, x_3) \mid x_1 < 0, x_2 \geq 0, x_3 \geq 0\},$ $\Omega_2 := \{(x_1, x_2, x_3) \mid x_1 \geq 0, x_2 < 0, x_3 \geq 0\},$ $\Omega_3 := \{(x_1, x_2, x_3) \mid x_1 \geq 0, x_2 \geq 0, x_3 < 0\},$ and wherein $\Omega_0$ is a nonnegative orthant and each $\Omega_i$, $i \in \{1, 2, 3\}$, contains points with negative i-th coordinate and nonnegative other coordinates, wherein g( ) comprises a volume of cut and fill between the first triangle and the modified first triangle.

4. The computer-implemented method of claim 1 wherein the obtaining the volume subgradient set based on the volume level set, in the Euclidean space comprises:
determining an approximate volume subgradient set, in Euclidean space.

5. The computer-implemented method of claim 4 wherein:
the approximate volume subgradient set outer approximates the volume subgradient set using a polyhedral function.

6. The computer-implemented method of claim 4 wherein:
the approximate volume subgradient set contains the volume subgradient set.

7. The computer-implemented method of claim 1 wherein the obtaining the volume level set comprises:
obtaining an approximation to the volume level set.

8. A computer-implemented method for designing a surface, comprising:
(a) obtaining, in a computer, an existing triangular surface mesh representative of an existing surface, wherein the existing triangular surface mesh comprises a first triangle and one or more additional triangles connected by vertices and edges;
(b) receiving a modification to the first triangle in compliance with one or more design constraints, resulting in a modified first triangle;
(c) obtaining a net volume minimization set, in Euclidean space, for the modified first triangle;
(d) determining a projection, of one or more heights of the vertices of the modified first triangle onto the net volume minimization set, wherein the projection comprises a direction and a distance;
(f) determining a scalar to reduce the distance;
(g) applying the scalar to reduce the distance of the projection, wherein:
  (i) the applying changes the existing triangular surface mesh into a converged triangular surface mesh;
  (ii) the converged triangular surface mesh minimizes one or more objective functions;
  (iii) one or more of the objective functions computes an absolute value of one or more net volumes; and
  (iv) each net volume of the one or more net volumes comprises a difference between a fill and a cut of earthwork material resulting from modifying the existing triangular surface mesh into the converged triangular surface mesh; and
(h) rendering the converged triangular surface mesh in a computer-aided design (CAD) application, wherein the existing surface is modified during construction based on the converged triangular surface mesh.

9. The computer-implemented method of claim 8 wherein:
the scalar is based on user input;
the determining the scalar comprises computing a proximity operator based on the scalar.

10. A computer-implemented system for designing a surface, comprising:
(a) a computer having a memory;
(b) a processor executing on the computer;
(c) the memory storing a set of instructions, wherein the set of instructions, when executed by the processor cause the processor to perform operations comprising:
  (1) obtaining, in a computer, an existing triangular surface mesh representative of an existing surface, wherein the existing triangular surface mesh comprises a first triangle and one or more additional triangles connected by vertices and edges;
  (2) receiving a modification to the first triangle in compliance with one or more design constraints, resulting in a modified first triangle;
  (3) obtaining a volume level set, in Euclidean space, for the modified first triangle;
  (4) obtaining a volume subgradient set based on the volume level set, in the Euclidean space;
  (5) determining a scalar from the area of the first triangle or the modified first triangle;
  (6) scaling heights between the vertices of the modified first triangle and the first triangle using the scalar;

(7) computing a projection, of one or more scaled heights of the vertices of the modified first triangle onto the volume subgradient set;
(8) scaling the projection using the scalar;
(9) removing the scaled projection from the vertices of the modified first triangle, wherein:
(i) the removing changes the triangular surface mesh into a converged triangular surface mesh;
(ii) the converged triangular surface mesh minimizes one or more objective functions; and
(iii) one or more of the objective functions computes an absolute earthwork volume between the first triangle on the existing surface and the modified first triangle on the converged triangular surface mesh; and
(10) rendering the converged triangular surface mesh in a computer-aided design (CAD) application, wherein the existing surface is modified during construction based on the converged triangular surface mesh.

11. The computer-implemented system of claim 10 wherein:
the scalar is based on user input;
the determining the scalar comprises computing a proximity operator based on the scalar.

12. The computer-implemented system of claim 10 wherein the volume minimization set is defined by a function f:

$$f(x_1, x_2, x_3) = \begin{cases} |x_1 + x_2 + x_3|, & (x_1, x_2, x_3) \in \Omega_0 \cup (-\Omega_0) \\ |g(x_1, x_2, x_3)|, & (x_1, x_2, x_3) \in \Omega_1 \cup (-\Omega_1) \\ |g(x_2, x_3, x_1)|, & (x_1, x_2, x_3) \in \Omega_2 \cup (-\Omega_2) \\ |g(x_3, x_1, x_2)|, & (x_1, x_2, x_3) \in \Omega_3 \cup (-\Omega_3) \end{cases}$$

where $\Omega_0 := \{(x_1, x_2, x_3) \mid x_1 \geq 0, x_2 \geq 0, x_3 \geq 0\}$, $\Omega_1 := \{(x_1, x_2, x_3) \mid x_1 < 0, x_2 \geq 0, x_3 \geq 0\}$, $\Omega_2 := \{(x_1, x_2, x_3) \mid x_1 \geq 0, x_2 < 0, x_3 \geq 0\}$, $\Omega_3 := \{(x_1, x_2, x_3) \mid x_1 \geq 0, x_2 \geq 0, x_3 < 0\}$, and wherein $\Omega_0$ is a nonnegative orthant and each $\Omega_i$, $i \in \{1, 2, 3\}$, contains points with negative i-th coordinate and nonnegative other coordinates, wherein g( ) comprises a volume of cut and fill between the first triangle and the modified first triangle.

13. The computer-implemented system of claim 10 wherein the obtaining the volume subgradient set based on the volume level set, in the Euclidean space comprises:
determining an approximate volume subgradient set, in Euclidean space.

14. The computer-implemented system of claim 13 wherein:
the approximate volume subgradient set outer approximates the volume subgradient set using a polyhedral function.

15. The computer-implemented system of claim 13 wherein:
the approximate volume subgradient set contains the volume subgradient set.

16. The computer-implemented system of claim 10 wherein the obtaining the volume level set comprises:
obtaining an approximation to the volume level set.

17. A computer-implemented system for designing a surface, comprising:
(a) a computer having a memory;
(b) a processor executing on the computer;
(c) the memory storing a set of instructions, wherein the set of instructions, when executed by the processor cause the processor to perform operations comprising:
(1) obtaining, in a computer, an existing triangular surface mesh representative of an existing surface, wherein the existing triangular surface mesh comprises a first triangle and one or more additional triangles connected by vertices and edges;
(2) receiving a modification to the first triangle in compliance with one or more design constraints, resulting in a modified first triangle;
(3) obtaining a net volume minimization set, in Euclidean space, for the modified first triangle;
(4) determining a projection, of one or more heights of the vertices of the modified first triangle onto the net volume minimization set, wherein the projection comprises a direction and a distance;
(5) determining a scalar to reduce the distance;
(6) applying the scalar to reduce the distance of the projection, wherein:
(i) the applying changes the existing triangular surface mesh into a converged triangular surface mesh;
(ii) the converged triangular surface mesh minimizes one or more objective functions;
(iii) one or more of the objective functions computes an absolute value of one or more net volumes; and
(iv) each net volume of the one or more net volumes comprises a difference between a fill and a cut of earthwork material resulting from modifying the existing triangular surface mesh into the converged triangular surface mesh; and
(7) rendering the converged triangular surface mesh in a computer-aided design (CAD) application, wherein the existing surface is modified during construction based on the converged triangular surface mesh.

18. The computer-implemented system of claim 17 wherein:
the scalar is based on user input;
the determining the scalar comprises computing a proximity operator based on the scalar.

* * * * *